(12) United States Patent
Steplyk et al.

(10) Patent No.: US 10,586,211 B2
(45) Date of Patent: Mar. 10, 2020

(54) SHARED COLLABORATION OBJECTS

(71) Applicant: Microsoft Technology Licensing, LLC, Redmond, WA (US)

(72) Inventors: Hayley Lynn Steplyk, Redmond, WA (US); Kathleen Rae Thompson, Seattle, WA (US); Kenneth Fern, Bellevue, WA (US); David Paul Limont, Seattle, WA (US); Joseph Patrick Masterson, Issaquah, WA (US); Darren Alexander Apfel, Redmond, WA (US); Rebecca Jean Lawler, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 521 days.

(21) Appl. No.: 15/186,166

(22) Filed: Jun. 17, 2016

(65) Prior Publication Data

US 2017/0364866 A1    Dec. 21, 2017

(51) Int. Cl.
*G06Q 10/10* (2012.01)
*G06F 16/93* (2019.01)
*G06Q 10/06* (2012.01)

(52) U.S. Cl.
CPC .......... *G06Q 10/103* (2013.01); *G06F 16/93* (2019.01); *G06Q 10/063114* (2013.01); *G06Q 10/101* (2013.01); *G06Q 10/1097* (2013.01)

(58) Field of Classification Search
CPC .............. G06Q 10/103; G06Q 10/101; G06Q 10/1097; G06Q 10/063114; G06F 16/93
See application file for complete search history.

(56) References Cited

U.S. PATENT DOCUMENTS

| 8,027,861 | B2 | 9/2011 | Brintle | |
|---|---|---|---|---|
| 8,032,553 | B2 | 10/2011 | Lippe et al. | |
| 8,082,308 | B1 | 12/2011 | Filev | |
| 10,395,216 | B2* | 8/2019 | Coffing | G06Q 50/182 |
| 2003/0097410 | A1* | 5/2003 | Atkins | H04L 29/06 |
| | | | | 709/206 |
| 2003/0112273 | A1* | 6/2003 | Hadfield | G06Q 10/10 |
| | | | | 715/751 |

(Continued)

OTHER PUBLICATIONS

"International Search Report and Written Opinion Issued in PCT Application No. PCT/US2017/036664", dated Oct. 6, 2017, 13 Pages.

(Continued)

*Primary Examiner* — Sujay Koneru

(57) ABSTRACT

Systems and methods for creating a collaborative object are provided. A collaborative object may be associated with a user interface that enables one or more users to interact regarding various tasks during the planning and execution of a project. In aspects, the collaborative object may include a task list, an associated document, compiled information and/or communications related to a project. In further aspects, the collaborative object, along with associated information, may be shared with other users as a resource for future projects. Permissions may be set on a collaborative object such that recipients may be allowed varying access to the task list, document, compiled materials and/or communications associated with the collaborative object.

20 Claims, 20 Drawing Sheets

(56) References Cited

U.S. PATENT DOCUMENTS

| | | | |
|---|---|---|---|
| 2003/0115333 A1* | 6/2003 | Cohen | G06F 16/958 709/227 |
| 2006/0080432 A1* | 4/2006 | Spataro | H04L 12/1831 709/224 |
| 2008/0244582 A1 | 10/2008 | Brown et al. | |
| 2010/0185547 A1* | 7/2010 | Scholar | G06Q 10/06 705/80 |
| 2011/0112881 A1* | 5/2011 | Malhotra | G06Q 10/10 705/7.21 |
| 2011/0313803 A1* | 12/2011 | Friend | G06Q 10/06311 705/7.13 |
| 2013/0041958 A1* | 2/2013 | Post | G06Q 10/107 709/206 |
| 2013/0124243 A1* | 5/2013 | Johnson | G06Q 10/0631 705/7.12 |
| 2013/0173486 A1* | 7/2013 | Peters | G06Q 10/00 705/319 |
| 2013/0173686 A1* | 7/2013 | Hu | G06F 11/3006 709/202 |
| 2013/0179515 A1* | 7/2013 | Chi | H04L 29/06401 709/206 |
| 2014/0082521 A1 | 3/2014 | Carolan et al. | |
| 2014/0280602 A1* | 9/2014 | Quatrano | H04L 67/02 709/205 |
| 2014/0298207 A1* | 10/2014 | Ittah | G06Q 10/00 715/753 |
| 2014/0310345 A1 | 10/2014 | Megiddo et al. | |
| 2015/0143258 A1* | 5/2015 | Carolan | G06F 3/0484 715/752 |
| 2015/0281148 A1 | 10/2015 | Masterson et al. | |
| 2016/0140139 A1 | 5/2016 | Torres et al. | |
| 2016/0224939 A1* | 8/2016 | Chen | G06Q 10/107 |
| 2016/0300033 A1* | 10/2016 | Duke | G16H 50/30 |
| 2016/0364674 A1* | 12/2016 | Macatangay | G06Q 10/06311 |
| 2017/0192401 A1* | 7/2017 | Wexler | G06F 17/30312 |
| 2018/0260081 A1* | 9/2018 | Beaudoin | G06F 3/04817 |

OTHER PUBLICATIONS

"Wrike", Published on: Dec. 20, 2015, 11 pages. Available at: https://www.wrike.com/help/email-integration/.

"Import & export projects from/to Wrike", Published on: May 11, 2015, 3 pages. Available at: https://www.wrike.com/apps/export-import/ical.

"ICloud: Share a reminder list", Retrieved on: Feb. 19, 2016, 1 page. Available at: https://support.apple.com/kb/PH12516?locale=en_US.

"Wiggio How to create to-do lists", Published on: Jan. 3, 2013, 1 page. Available at: https://www.youtube.com/watch?v=QX7ZgbM_wtE.

"Producteev by Jive", Published on: Jun. 27, 2014, 78 pages. Available at: https://www.producteev.com/userguide.

"Quip changes the way teams work together", Published on: Oct. 14, 2014, 5 pages. Available at: https://quip.com/about/tour.

"Wunderlist", Retrieved on: Feb. 19, 2016, 2 pages. Available at: https://support.wunderlist.com/customer/portal/articles/1641005.

"Project management, as effective as it gets", Retrieved on: Feb. 19, 2016, 6 pages. Available at: https://www.zoho.com/projects/?utm_source=capterra&utm_medium=cpc&utm_campaign=zprojects.

* cited by examiner

FIG. 5

SHARED COLLABORATION OBJECTS

BACKGROUND

Today, task lists are generally buried within communications between individuals. Accordingly, it is difficult for users to track tasks for a particular project, both for themselves and for others who are working on the project. Not only so, but the communications surrounding a task list, as well as information and research resulting from tasks of the task list (e.g., product launch activities, planning items for a trip, planning items for an event, etc.) are not currently associated with the task list. Moreover, there is no current capability to share a task list, along with associated communications and information, as a resource for future projects.

It is with respect to these and other general considerations that embodiments have been described. Also, although relatively specific problems have been discussed, it should be understood that the embodiments should not be limited to solving the specific problems identified in the background.

SUMMARY

The disclosure generally relates to a system and methods for creating a collaborative object. A collaborative object may be associated with a user interface that enables users to interact regarding various tasks, communications, and information compiled during the planning and execution of a project. In aspects, the collaborative object may include a task list, an associated document, materials compiled for one or more tasks and/or communications related to a project. In further aspects, the collaborative object, along with associated information, may be shared with other users as a resource for future projects. Additionally, permissions may be set on a collaborative object such that recipients may be allowed varying access to the task list, information and/or communications associated with the collaborative object.

In one aspect, a system is provided. The system includes a processing unit and a memory storing computer executable instructions that, when executed by the processing unit, cause the system to perform actions. For instance, in response to the computer executable instructions, the system receives a task list for a project, where the task list includes a plurality of tasks, and creates a collaborative object including the task list. Additionally, the system associates a task to a document and receives an update to the document to complete the task. In response to receiving the update to the document, the system updates the task list to reflect completion of the task and provides a control for performing an action upon completion of the task list.

In another aspect, a method is provided. The method includes receiving a task list for a project, wherein the task list includes a plurality of tasks, and creating a collaborative object including the task list. The method further includes receiving at least one task product satisfying a task of the task list and associating the task product with the task in the collaborative object. Additionally, the method includes sharing the collaborative object with one or more users.

In yet another aspect, a computer-readable storage medium is provided. The computer-readable storage medium stores computer executable instructions that, when executed by at least one processing unit, cause a computing device to receive a task list for a project, wherein the task list includes a plurality of tasks, and create a collaborative object including the task list. The computer executable instructions further causing the computing device to receive a communication related to the project and associate the communication with the collaborative object. Additionally, the computer executable instructions cause the computing device to receive a task product satisfying a task of the task list and associate the task product with the task in the collaborative object.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 5 illustrates an interface for opening a document associated with a collaborative object in an attachments view of an email application, according to an example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As described above, the disclosure generally relates to a system and methods for creating a collaborative object. A collaborative object may be associated with a user interface that enables users to interact regarding various tasks during the planning and execution of a project. In aspects, the collaborative object may include a task list, an associated document, materials compiled for one or more tasks and/or communications related to a project. In further aspects, the collaborative object, along with associated information, may be shared with other users as a resource for future projects. Additionally, permissions may be set on a collaborative object such that recipients may be allowed varying access to the task list, information and/or communications associated with the collaborative object. It is with respect to these and other general considerations that embodiments have been made.

Figure 1:
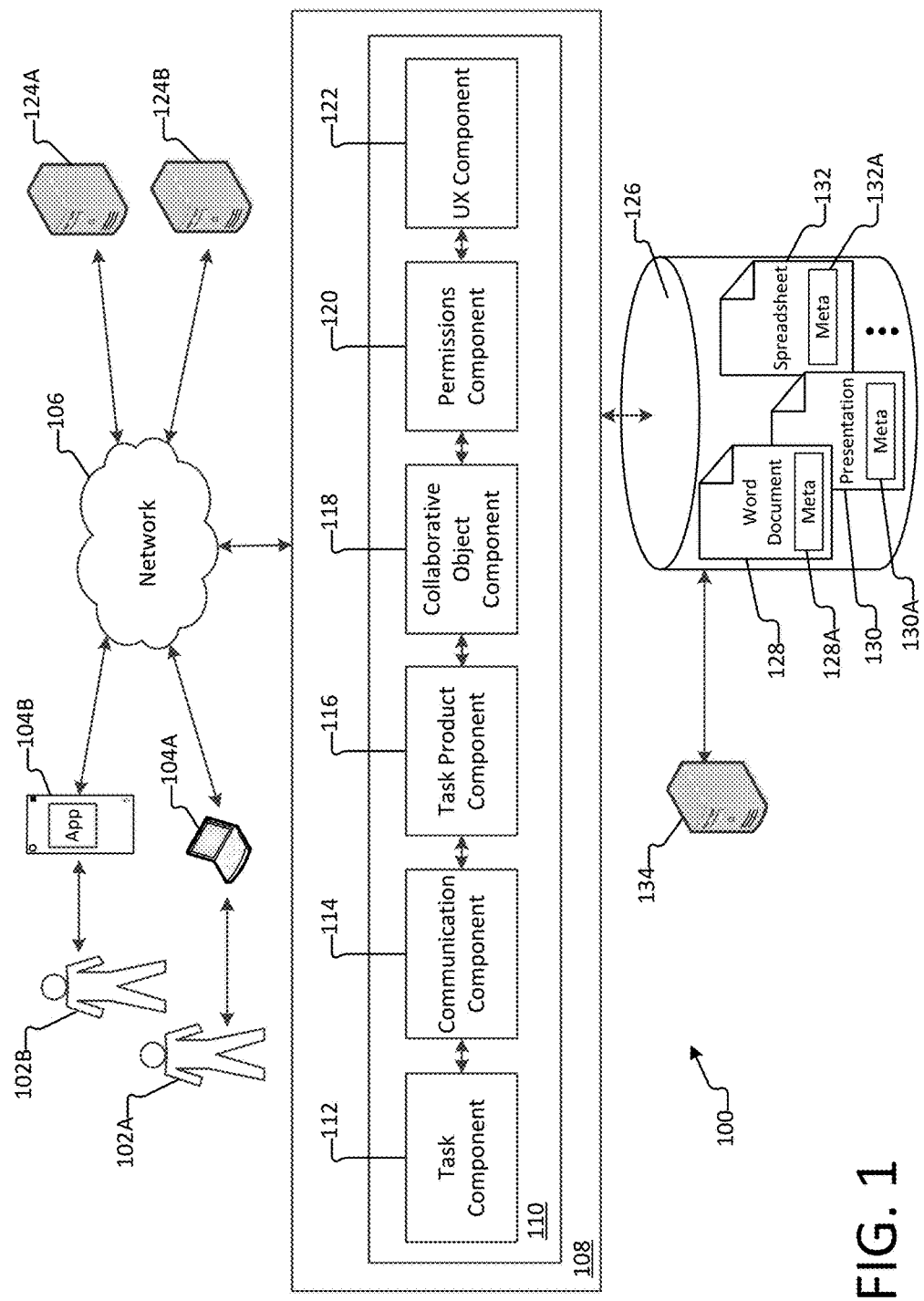
FIG. 1 illustrates a system for creating a collaborative object, according to an example embodiment.

FIG. 1 illustrates a system for creating a collaborative object, according to an example embodiment.

As illustrated, system 100 may include one or more client computing devices 104 (e.g., client computing devices 104A and 104B) that may execute a client version of a collaboration application capable of creating and sharing collaborative objects comprising one or more tasks. In some examples, the client collaboration application may execute locally on a client computing device 104. In other examples, a client collaboration application (e.g., a mobile app on a thin client computing device 104) may operate in communication (e.g., via network 106) with a corresponding server version of collaboration application 110 executing on one or more server computing devices, e.g., server computing device 108. In still other aspects, rather than executing a client version of a collaboration application, the one or more client computing devices 104 may remotely access, e.g., via a browser over network 106, the collaboration application 110 implemented on the server computing device 108 or multiple server computing devices (e.g., in a distributed computing environment such as a cloud-computing environment). In aspects, the collaboration application, whether executed on a client, a server, or in a cloud-computing environment, may be integrated into or in communication with an electronic mail or messaging application, a co-authoring application, a peer-to-peer application, a presentation application, a spreadsheet application, and the like.

As illustrated by FIG. 1, a server version of collaboration application 110 is implemented by server computing device 108. As should be appreciated, the server version of collaboration application 110 may also be implemented in a distributed environment (e.g., cloud-computing environment) across a plurality of server computing devices (not shown). Moreover, as should be appreciated, either a client or a server version of the collaboration application 110 may be capable of creating and sharing collaborative objects. While a server version of the collaboration application 110 and associated components 112-122 are shown and described, this should not be understood as limiting. Rather, a client version of collaboration application 110 may similarly implement components 112-122 on a client computing device 104.

In a basic configuration, the one or more client computing devices 104 are personal or handheld computers having both input elements and output elements operated by one or more users 102 (e.g., user 102A and user 102B). For example, the one or more client computing devices 104 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing a client collaboration application and/or remotely accessing collaboration application 110 may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing device 108 may communicate with some components of the system via a local network (e.g., an enterprise intranet), whereas server computing device 108 may communicate with other components of the system via a wide area network (e.g., the Internet). In addition, the aspects and functionalities described herein may operate over distributed systems (e.g., cloud-computing systems), where application functionality, memory, data storage and retrieval, and various processing functions may be operated remotely from each other over a distributed computing network, such as the Internet or an intranet.

As described above, the collaboration application 110 may be implemented on a server computing device 108. In a basic configuration, server computing device 108 may include at least a processing unit and a system memory for executing computer-readable instructions. In some aspects, server computing device 108 may comprise one or more server computing devices 108 in a distributed environment (e.g., cloud-computing environment). Server computing device 108 may create collaborative objects for sharing between the one or more client computing devices 104 and/or one or more other server computing devices (e.g., server computing devices 124A and/or 124B) via network 106.

In some cases, a collaborative object may be associated with a task list, one or more task products, and/or one or more communications. A task list may include a series of any number of tasks for managing or accomplishing a goal, project, job, assignment, activity, event, etc. (collectively referred to herein as a "project"). In some aspects, a task list may include a series of sub-tasks for managing or accomplishing a task, which along with other tasks may result in managing or accomplishing a project. In this case, a task list may be nested within another task list. In aspects, a collaborative object may be generated for each task list, where one collaborative object is nested within and/or linked to the other. Alternatively, a single collaborative object may be generated that includes a plurality of task lists. As should be appreciated, a collaborative object may be generated by any suitable means for facilitating collaboration and facilitating management and/or accomplishment of a project.

A task product may include any type of output resulting from a task or sub-task. For example, a task product may include any type of document (e.g., word processing document, spreadsheet document, presentation document, etc.), any update to a document (e.g., edits, deletions, additions, etc.), any type of information (e.g., search results, venue reservations, phone numbers, addresses, restaurant locations, hotel reservations, flight arrangements, car rentals, research data, etc.), and the like. In addition, a communication may include any type of message regarding a task list and/or an associated project, e.g., an email message, a text message (e.g., SMS message), an instant message (e.g., chat message), a voicemail message, and the like.

In some aspects, various document applications may generate the one or more documents (e.g., word document 128, presentation document 130, and spreadsheet document 132) associated with a task list. The one or more documents may be stored in a storage location (e.g., storage 126) or multiple storage locations (not shown) accessible to collaboration application 110. In aspects, metadata may be associated with the one or more documents. For example, the metadata may provide a reference or pointer for associating the one or more documents with a collaborative object. As shown, metadata 128A is appended to word document 128, metadata 130A is appended to presentation document 130, and metadata 132A is appended to spreadsheet document 132. Similarly, the one or more communications may be generated by a communication application (e.g., email application, instant messaging application, etc.) that may be hosted by server computing device 108 or by another server computing device (e.g., server computing devices 124A, 124B and/or 134). The one or more communications may be stored in storage location 126 (not shown) or in any other storage location accessible to collaboration application 110.

As illustrated in FIG. 1, the collaboration application 110 may include various components for creating a collaborative object associated with a task list, including a task component 112, a communication component 114, a task product component 116, a collaborative object component 118, a permissions component 120, a UX component 122, and the like. In aspects, each component may communicate and pass data between the other components. The various components may be implemented using hardware, software, or a combination of hardware and software. Moreover, the various components may be executed on a single server computing device (e.g., server computing device 108), on multiple server computing devices (e.g., server computing devices 124A, 124B and/or 134), or locally on a client computing device (e.g., client computing device 102A or 102B).

As described above, the collaboration application 110 may be configured to generate a collaborative object for a project, the collaborative object including a task list as well as one or more task products and/or one or more communications. In aspects, task component 112 may receive a task list. As detailed above, a task list may include a series of any number of tasks for managing or accomplishing a project. In some aspects, a task list may be dynamic and/or interactive, e.g., upon a task being completed, a notification may be sent, an action may be taken (e.g., a task product may be sent to the user associated with the next task in the task list), and the like. A task list may be received by task component 112 in response to a user typing a list of items and converting the list into a task list (e.g., by highlighting the list and selecting a "convert to task list" control), in response to a user selecting a "task icon" control and entering items into a formatted task list interface or text box generated in the user interface, or any other suitable method for receiving a task list.

Communication component 114 may receive one or more communications relating to the task list and/or the project. In aspects, communication component 114 may detect that a communication is related to a task list and/or project based on analyzing terms used in the message (e.g., within the subject field of the message, the message body, etc.) and/or by recognizing that attachments to the message are related to the task list and/or project. In further aspects, communication component 114 may detect that a communication is related to a task list and/or project based on recognizing that the communication falls within a thread of communications relating to the task list and/or project (e.g., within a "reply" message). In still other aspects, communication component 114 may detect that a communication is related to a task and/or project based on the group of users included as sender or recipients of the message. In some cases, communication component 114 may receive a selection to associate the communication with the task list and/or project. As should be appreciated, communication component 114 may receive one or more communications relating to a task list and/or project by any suitable means. The above examples are provided for purposes of explanation should not be considered to be limiting.

Task product component 116 may receive one or more task products for satisfying or completing a task. As detailed above, a task product may include any type of output resulting from a task or sub-task. For example, a task product may include any type of document (e.g., word processing document, spreadsheet document, presentation document, etc.), any update to a document (e.g., edits, deletions, additions, etc.), any type of information (e.g., search results, venue reservations, phone numbers, addresses, restaurant locations, hotel reservations, flight arrangements, car rentals, research data, etc.), or anything else. In a first example, a project may relate to a homework assignment and a task list may include duties assigned to various students for completing the homework assignment. In this case, a document (e.g., a lab report in a word document format) may be the homework assignment and the tasks may be associated with different portions of the document (e.g., hypothesis, procedure, test results, analysis, conclusion, etc.). A student may complete a task by completing a portion of the lab report document (e.g., adding the procedure section, compiling test results in a table, etc.). In this example, each portion of the lab report completed by a student may be referred to as a "task product" satisfying the task assigned to the student. In a second example, a project may relate to planning an event. In this case, the task list may include duties assigned to members of a committee and each task may relate to an aspect of planning the event (e.g., ordering flowers, finding a caterer, reserving a venue, etc.). A task product may be information satisfying a task (e.g., search results for caterers, an invoice or contract with the florist, an invoice or contract with the caterer, a contract with the venue, etc.). In some cases, a task may not be satisfied by a task product (e.g., for a task, "call florist," a user may simply mark the task complete upon calling the florist); while in other cases, a task may be satisfied by a task product (e.g., for a task, "research local florists," the user may associate a list of local florists with notes and contact information as a task product that satisfies the task). As should be appreciated, the above examples are provided for purposes of explanation should not be considered to be limiting.

Collaborative object component 118 may create a collaborative object for a task list associated with a project. In aspects, as detailed above, a collaborative object may link the task list with a document, task products and/or communications. As should be appreciated, a collaborative object may be created by any suitable means. For example, a task list may be created first and then a collaborative object may be created automatically or by user selection. Alternatively, a collaborative object may be created first and a task list may be added to the collaborative object. The collaborative object may incorporate a user interface for providing functionality in addition to the task list, such as options for associating task products, documents and/or communications with the task list. For example, a user may attach or associate a task product to a task (e.g., by selecting an attachment icon) within the collaborative object. When the task product is attached to the collaborative object, a link or reference may be established between the collaborative object and the task product. In some cases, a document (e.g., a document that is the subject of the project, e.g., homework assignment, product report, financial statement, business plan, etc.) may also be associated with the collaborative object by link, reference or otherwise. In this case, various tasks within the task list may reference different sections of the document (e.g., each task may correspond to a different section of the document). When a user completes a section of the document, the corresponding task may be completed within the task list. In some cases, when the section of the document is completed, the associated task may automatically be updated within the task list to reflect its completion. In aspects, when a collaborative object is accessed (e.g., opened), a user may access the related task list, task products, document and/or communications from a single location or user interface.

Additionally, the collaborative object may be portable such that the collaborative object can be shared between users. As provided herein, some users may be collaborators or team members on a project. In aspects, the collaborative object may be accessible to each of the collaborators or team members. Additionally, e.g., upon finishing a project, the collaborative object may be associated with information that would be useful to external or outside users (e.g., users who were not collaborators or team members but who may benefit from the information for a subsequent project). For instance, the project may involve planning a wedding. The task list may include a series of tasks for managing and/or executing the wedding and the associated task products may satisfy one or more tasks. As described above, the task products may include information for planning the wedding, such as a list of caterers (including addresses, contact information, pricing, etc.), a list of venues (including locations, contact person(s), contact phone numbers, pricing, availability, terms, etc.), a list of florists (including contact person(s), contact phone numbers, lead times, pricing, etc.), a list of photographers (including contact names, contact phone numbers, package pricing, availability, etc.), and the like. As detailed above, such task products may be stored with or linked to the collaborative object. In this case, at some later time, it would be beneficial to share the collaborative object, along with its associated task products, with another user to aid in planning a wedding.

In this regard, specific information generated for completing a project may be highly beneficial to a user interested in completing the same or similar project. For instance, the information associated with a collaborative object may be particularly useful with respect to completing the same or similar project within the same or similar geographic area (e.g., a wedding), or a project with the same or similar facts (e.g., a startup organization launching a new product, a lab report regarding photosynthesis, etc.), or a project with the same or similar requirements (e.g., tasks for complying with Sarbanes Oxley), and the like. That is, while "task lists" for planning a wedding may be readily available, a task list associated with pertinent information for a particular city or municipality may not be available. For instance, a user living in Houston and planning a wedding in Des Moines, Iowa, would find it particularly useful to receive a task list including local venues, florists, photographers, etc., from a user who planned a wedding in Des Moines, Iowa. In some cases, a collaborative object may include associated information regarding workflow failures, such as a florist to avoid, a task that should be added to the task list, a task that should be implemented sooner, etc. As should be appreciated, a collaborative object associated with a task list, task products and/or communications regarding the project may be useful to collaborators while planning the event as well as outside users planning later events.

Permissions component 120 may allow permissions to be set on a collaborative object. For instance, in some cases, various collaborators or team members for a project may have different levels of access to the project (e.g., to financial information associated as a task product, to certain communications, etc.). In this case, permissions may be set to limit access to various task products and/or communications by certain collaborators. Alternatively, permissions may be set on a collaborative object before sharing the collaborative object with an external user. For instance, with reference to the wedding planning project, a user may desire to share a list of caterers, but not an invoice for catering services that were actually contracted. In this case, permissions may be set on the collaborative object to prevent outside users from accessing all of the information associated with the collaborative object. On the other hand, a user may allow his or her spouse full access to a collaborative object. In aspects, permissions may be set on any aspect of the collaborative object. For instance, permissions (e.g., read access, full read/write access, no access, etc.) may be set for one or more users, one or more tasks, one or more task products, one or more communications, and the like. In some aspects, permissions may be set when the collaborative object is created or any time thereafter.

UX component 122 may communicate with one or more other components to provide an interface for accessing (or opening) a collaborative object. In some aspects, a user interface (UI) element may be representative of a collaborative object. The UI element may be portable such that it may be copy/pasted, drag/dropped, or otherwise moved or shared between users. In aspects, the UI element may be provided in a condensed view or an expanded view. The condensed view of the UI element may display a minimal amount of information regarding the project. For instance, the condensed UI element may display a document indicator for an associated document (e.g., an icon representative of a word processing document, a presentation document, a spreadsheet document, etc.), a status indicator for a task list (e.g., 2 of 3 tasks completed), a communication counter identifying a number of associated communications (or a number of recent communications, or a number of unread communications, etc.), an update indicator identifying a number of updates to a document, a project identifier representative of a project (e.g., a picture of Maui, a wedding bouquet, etc.), or any other suitable icon or indicator.

In some cases, the indicators may act as controls. For instance, in response to receiving a selection of the document indicator, the document may be opened in a document view. In some aspects, the document view may be a user interface with one or more panes, including a document pane, a task pane and/or a communications pane. The document view may be associated with a word processing application or other application (e.g., attachment view of an email application, etc.) that allows for editing of the document. In some cases, tasks in the task pane may have hyperlinks to portions of the document to which they relate. For instance, a task for updating a conclusion may link to the conclusion portion of the document. As should be appreciated, in some aspects, selecting the document indicator may merely open the document in a document application (e.g., word processing application, spreadsheet application, presentation application, etc.) and may not include additional access to the task list and/or related communications.

In further aspects, the condensed UI element may be expanded, e.g., upon selection of a control. The expanded UI element may display icons or indicators displayed by the condensed UI element, as well as additional information. For instance, in addition to a status indicator for the task list, the expanded UI element may further display the list of tasks, along with a completion status for each task (e.g., a checked box for completed items, an empty box for incomplete items). In some cases, where a communication counter is provided in the condensed UI element, the expanded UI element may provide details regarding the communications (e.g., subject, sender, recipients, date, attachment indicator, etc.). Additionally, where an update indicator is provided in the condensed UI element, the expanded UI element may provide details regarding the updates to the document (e.g., Joey made 2 updates to the conclusion section, Stacy made 3 edits to the document, etc.). Further, the expanded UI element may provide a control for performing an action upon completion of a task list. For instance, upon completion of tasks associated with a homework project, the expanded UI element may provide a control for turning in the homework assignment. The expanded UI element may also include a document indicator, which may function to launch the document, as described above.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
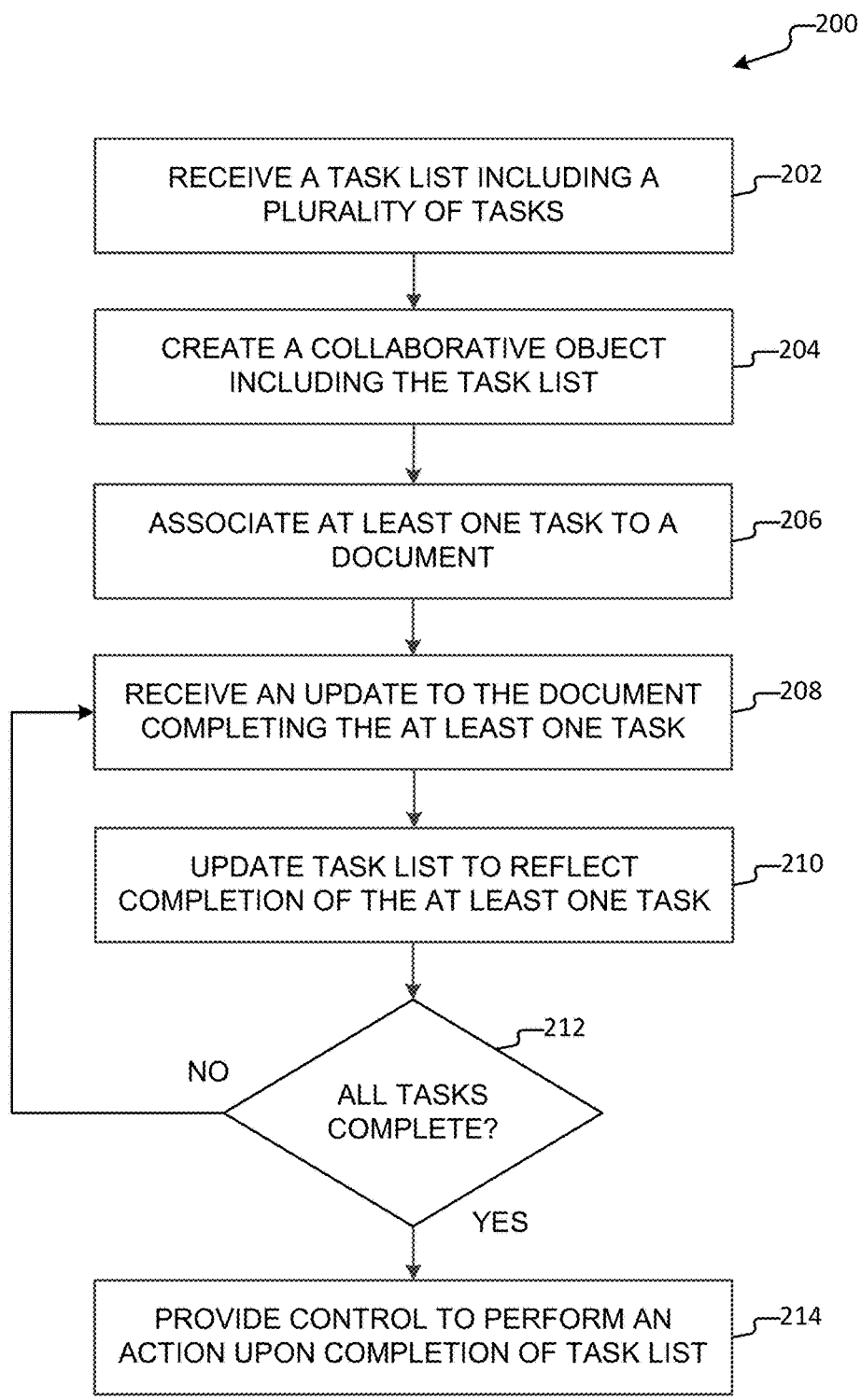
FIG. 2 illustrates a method for creating a collaborative object associated with a task list and a document, according to an example embodiment.

FIG. 2 illustrates a method for creating a collaborative object associated with a task list and a document, according to an example embodiment.

Method 200 begins with receive task list operation 202, where a collaboration application such as collaboration application 110 (or an application in communication with the collaboration application 110) may receive a list of tasks. Applications in communication with the collaboration application 110, as detailed above, may include a word processing application, a presentation application, a spreadsheet application, a mail application, etc. In aspects, a UX component (e.g., UX component 122) may facilitate a user experience (UX) by providing a user interface (UI) for receiving the task list via a display. Selections and/or inputs of the task list may be received by the user interface based on gestures, touch, mouse movements, and the like. The user interface may operate in conjunction or communication with one or more other components of collaboration application 110 (e.g., task component 112) when receiving the task list. For instance, the task list may be received in response to a user typing a list of items and converting the list into a task list (e.g., by highlighting the list and selecting a "convert to task list" control), in response to a user selecting a "task list" control and entering items into a formatted interface or text box generated by the user interface, or any other suitable method for receiving the task list.

At create operation 204, a collaborative object including the task list may be created. In aspects, a collaborative object component 118 of collaboration application 110 may create the collaborative object. As should be appreciated, a collaborative object may be created by any suitable means. For example, a task list may be created first and then a collaborative object may be created automatically or by user selection. Alternatively, a collaborative object may be created first and a task list may be added to the collaborative object. In still other cases, as detailed below, a document may be created first and the collaborative object and/or the task list may be created thereafter by user selection or otherwise. The collaborative object may further incorporate a user interface for providing additional functionality, such as options for associating documents, task products and/or communications with a task list. In aspects, when a collaborative object is accessed (e.g., opened), a user may access the related task list, task products, document and/or communications from a single location (or user interface).

At associate operation 206, at least one task of the task list may be associated with a document. In aspects, a collaborative object component 118 of collaboration application 110 may provide a UI control for associating a document with a task within the collaborative object. As detailed above, a document may include any type of document, e.g., a word processing document, a presentation document, a spreadsheet document, a mail document, etc. In some aspects, as noted above, the document may be created first and the collaborative object may be created based on user selection of a control within the document application. In this case, the project may correspond to completion of the document (e.g., homework assignment, product report, financial statement, business plan, etc.). By way of example, upon creating the collaborative object, a task list may be created with a series of tasks directed to completing the document. A link may be created between at least one task and a section of the document to which the task is directed. By clicking the link, the user may automatically advance to the section of the document referenced by the at least one task. In other example, as described above, the collaborative object may be created first and a document (e.g., a document which is the subject of the project) may be associated with at least one task of the collaborative object by user selection. As should be appreciated, a document may be associated with at least one task of the task list by any suitable means.

At receive update operation 208, an update may be received to the document that completes the at least one task. An update to a document may include an edit to an existing portion of the document, an addition to the document, a deletion from the document, and the like. For instance, if the task states: "Joey, please complete the introductory slides for the presentation," an update to a presentation document may include adding slides, removing slides or revising slides in the introduction section. Alternatively, the task may state:

"Kat, after Joey is done with the introductory slides, please add the conclusion." In this case, in order to complete the task, Joey must complete the introductory slides and Kat must add the conclusion. As should be appreciated, an update to the document that completes a task may be received by any suitable means and may include any appropriate update to the document for satisfying the task.

At update operation 210, the task list may be updated to reflect completion of the at least one task. For instance, the task may be updated to reflect completion by providing a checked box adjacent to the task. In some cases, a status of the task may be updated by user selection (e.g., manually checking the box); alternatively, upon receiving the update to the document, the status of the task may automatically be updated to reflect completion.

At decision operation 212, it may be determined whether each task of the task list has been completed. When each task of the task list has been completed, the method may advance to provide operation 214. When each task of the task list has not been completed, the method may return to receive update operation 208.

At provide operation 214, a user interface (UI) control may be provided for performing an action. For instance, upon completing each task of the task list, a UI control may be provided for advancing to a next stage in a project. For instance, if the task list relates to tasks for completing a homework assignment, a UI control for turning the homework assignment in may be provided upon completion of each task. Alternatively, if the task list relates to completing a change order for a manufacturing contract, a UI control for submitting the change order for approval may be provided upon completion of each task. As should be appreciated, a UI control for performing any action upon completion of the task list may be provided. In aspects, upon selection of the UI control, the action may be performed.

As should be appreciated, operations 202-214 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 3:
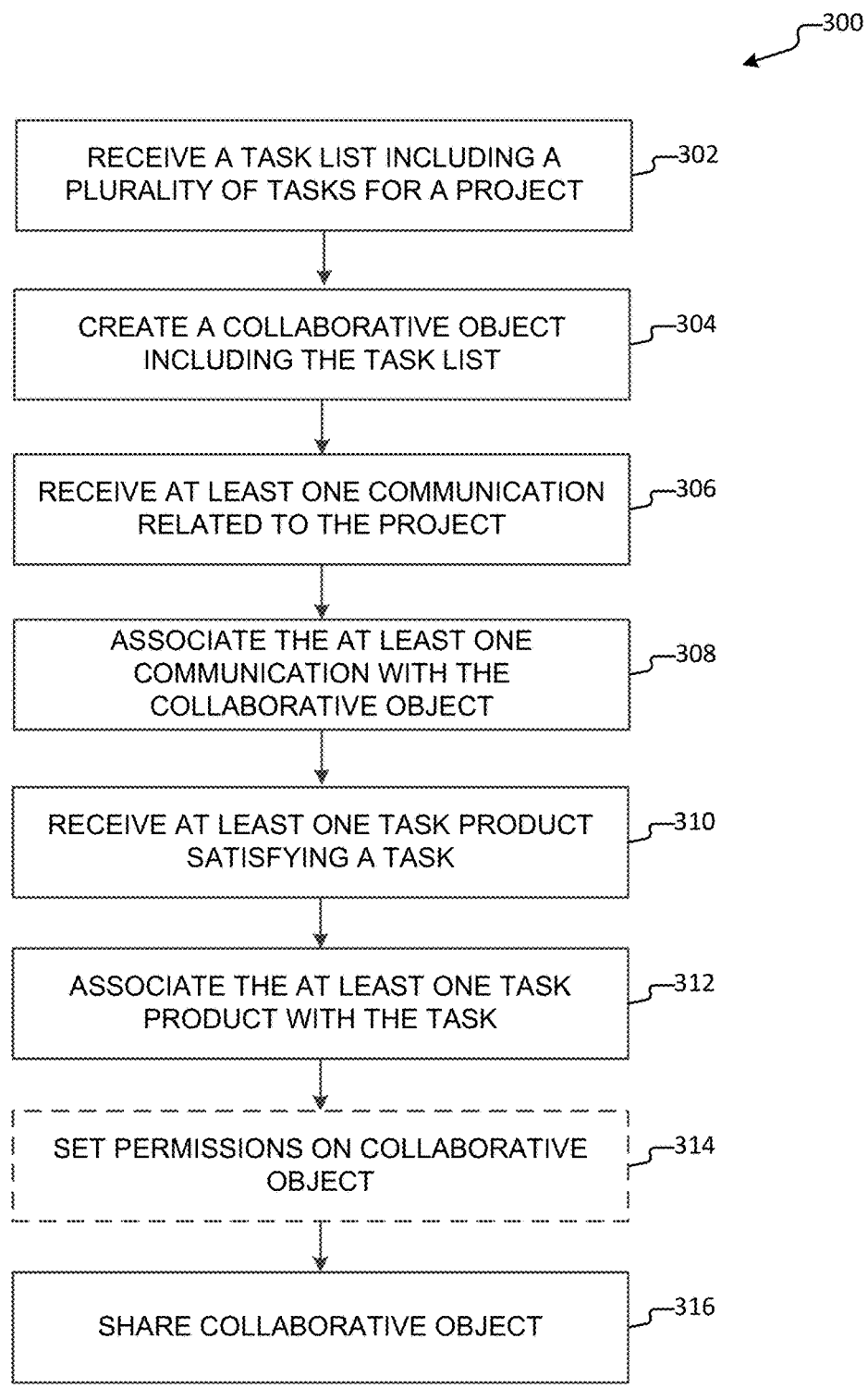
FIG. 3 illustrates a method for creating a collaborative object associated with a task list, at least one task product and at least one communication, according to an example embodiment.

FIG. 3 illustrates a method for creating a collaborative object associated with a task list, at least one task product and at least one communication, according to an example embodiment.

Method 300 begins with receive task list operation 302, similar to task list operation 202, where a collaboration application such as collaboration application 110 (or an application in communication with the collaboration application 110) may receive a task list including a plurality of tasks for a project. As detailed above, a project may include any a goal, job, assignment, activity, event, etc. Selections and/or inputs of the task list may be received by a user interface associated with collaboration application 110 based on gestures, touch, mouse movements, and the like. The user interface may operate in conjunction or communication with one or more other components of collaboration application 110 (e.g., task component 112) when receiving the task list. For instance, the task list may be received in response to a user typing a list of items and converting the list into a task list (e.g., by highlighting the list and selecting a "convert to task list" control), in response to a user selecting a "task list" control and entering items into a formatted interface or text box generated by the user interface, or any other suitable method for receiving the task list.

At create operation 304, a collaborative object including the task list may be created. In aspects, a collaborative object component 118 of collaboration application 110 may create the collaborative object. As should be appreciated, a collaborative object may be created by any suitable means. For example, a task list may be created first and then a collaborative object may be created automatically or by user selection. Alternatively, a collaborative object may be created first and a task list may be added to the collaborative object. The collaborative object may further incorporate a user interface for providing additional functionality, such as options for associating one or more task products and/or one or more communications with the task list. In aspects, when a collaborative object is accessed (e.g., opened), a user may access the related task list, one or more task products and/or one or more communications from a single location (or user interface).

At receive communication operation 306, at least one communication relating to the project may be received. In aspects, a communication component 114 of collaboration application 110 may receive the communication. As detailed above, the communication may include any type of message regarding the project, e.g., an email message, a text message (e.g., SMS message), an instant message (e.g., chat message), a voicemail message, and the like, generated by any message application in communication with collaboration application 110. In aspects, receiving the at least one communication may include detecting that the communication is related to a task list and/or project based on analyzing terms used in the message (e.g., within the subject field of the message, the message body, etc.) and/or by recognizing that attachments to the message are related to the task list and/or project. In further aspects, detecting that the communication is related to a task list and/or project may be based on recognizing that the communication falls within a thread of communications relating to the task list and/or project (e.g., within a "reply" message). In still other aspects, detecting that the communication is related to a task and/or project may be based on the group of users included as sender or recipients of the message. As should be appreciated, the at least one communication relating to the project may be received by any suitable means.

At associate communication operation 308, the at least one communication may be associated with the collaborative object. In some cases, when it is detected that a communication relates to the project, the communication may automatically be associated with the collaborative object. In other cases, a selection to associate the communication with the collaborative object may be received. As detailed above, a communication may be generated within a message application (e.g., email application, instant messaging application, etc.) in communication with the collaboration application. Further, the communication may be stored in any storage location accessible to the collaboration application. The communication may be associated with the collaborative object by a link, reference, pointer, or any other method of association. In aspects, when the collaborative object is accessed, at least the task list and one or more communications may be presented to the user in a single user interface.

At receive task product operation 310, at least one task product may be received. A task product may include any type of output resulting from (or satisfying) a task or sub-task. For example, a task product may include any type of document (e.g., word processing document, spreadsheet document, presentation document, etc.), any update to a document (e.g., edits, deletions, additions, etc.), any type of information (e.g., search results, venue reservations, phone numbers, addresses, restaurant locations, hotel reservations, flight arrangements, car rentals, research data, etc.), and the like. A task product may be received automatically (e.g., when a user completes a portion of an associated document) or by user selection (e.g., a selection to upload or attach the task product to the completed task). As should be appreciated, the at least one task product may be received by any suitable means.

At associate task product operation 312, the at least one task product may be associated with the task that was satisfied (or completed). For example, a user may attach or associate a task product to a task (e.g., by selecting an attachment icon) within a user interface provided by the collaborative object. When the task product is attached to the collaborative object, a link or reference may be established between the collaborative object and the task product. In this case, when the collaborative object is accessed, at least the task list, the at least one communication and the at least one task product may be presented to the user in a single user interface.

At optional permissions operation 314 (identified by dashed lines), permissions may optionally be set on the collaborative object. For instance, in some cases, a user may wish to provide different levels of access to a project (e.g., to financial information associated as a task product, to certain communications, etc.) for various collaborators or team members. In this case, permissions may be set to limit access by certain team members to various tasks listed in the task list, various task products and/or various communications associated with the collaborative object. Alternatively, permissions may be set on a collaborative object before sharing the collaborative object with an external user. For instance, permissions may be set on the collaborative object such that an external user may have access to general information (e.g., a list of caterers) but preventing access to personal information (e.g., invoice, airline ticket, etc.) associated with the collaborative object. On the other hand, a user may allow his or her spouse to have full access to a collaborative object. In aspects, permissions may be set on any aspect of the collaborative object. For instance, permissions (e.g., read access, full read/write access, no access, etc.) may be set for one or more users, one or more tasks, one or more task products, one or more communications, sections of a document, and the like. In some aspects, permissions may be set when the collaborative object is created or any time thereafter.

At share collaborative object operation 316, the collaborative object may be portable and may be shared with other users. For instance, the collaborative object may be associated with a UI element that may be copy/pasted, drag/dropped, or otherwise shared with another user via an email message, instant message, or otherwise. As further described above, the collaborative object may be shared with collaborators or team members working on the project for which the collaborative object was created. In this case, the collaborative object may be updated by the various team members as tasks are completed, task products are attached, communications transpire regarding the project, and the like. Alternatively, the collaborative object may be shared with external users as a resource for completing similar projects. For example, a collaborative object directed to planning a wedding may later be shared with an external user as a resource for planning a subsequent wedding. As should be appreciated, as collaborative objects are portable and include information generated in completing a project (e.g., task products, etc.), collaborative objects are beneficial for use as a resource for planning similar projects at a later time. Based on user preference, as detailed above, permissions may be set on the collaborative object to limit access to certain information associated with the collaborative object.

As should be appreciated, operations 302-316 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 4A:
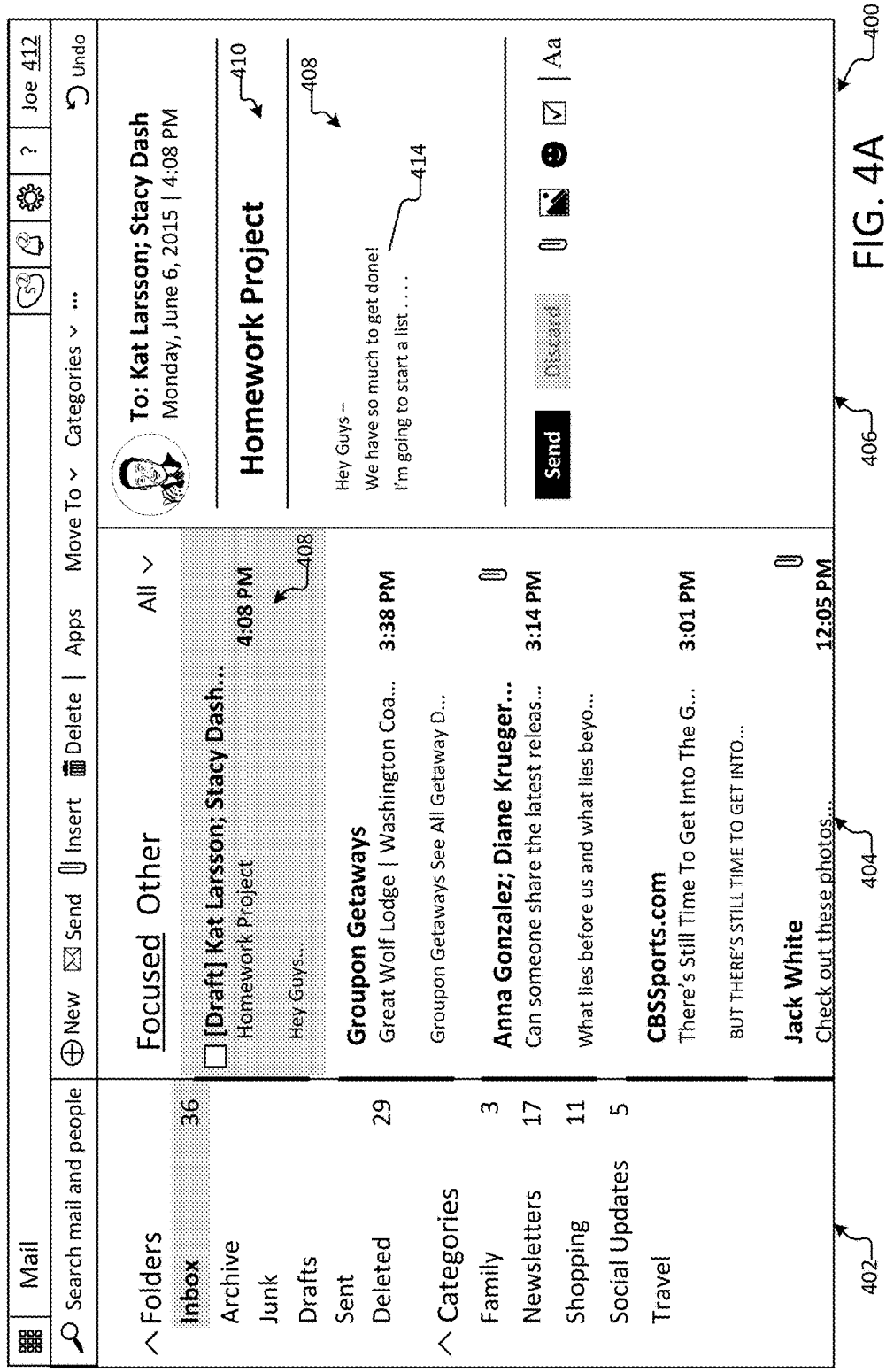
FIG. 4A illustrates an interface for creating a task list in an email application, according to a first view of an example embodiment.

FIG. 4A illustrates an interface for creating a task list in an email application, according to a first view of an example embodiment.

As illustrated, a first view of interface 400 of an email application is provided. The first view of interface 400 includes a navigation pane 402, a list pane 404, and a reading pane 406. Email 408 is displayed in reading pane 406 and list pane 404. Email 408 includes a subject line 410, entitled "Homework Assignment," and recipients "Kat Larsson" and "Stacy Dash." As illustrated, email 408 is a draft email (see, e.g., list pane 404) that is being drafted by "Joe" (see, e.g., user identifier 412) at 4:08 PM on Monday, Jun. 6, 2015. Email 408 further includes a message 414, which states: "Hey Guys—We have so much to get done! I'm going to start a list . . . "

As should be appreciated, the various devices, components, etc., described with respect to FIG. 4A are not intended to limit the systems and methods to the particular components described. Accordingly, additional topology configurations may be used to practice the methods and systems herein and/or some components described may be excluded without departing from the methods and systems disclosed herein.

Figure 4B:
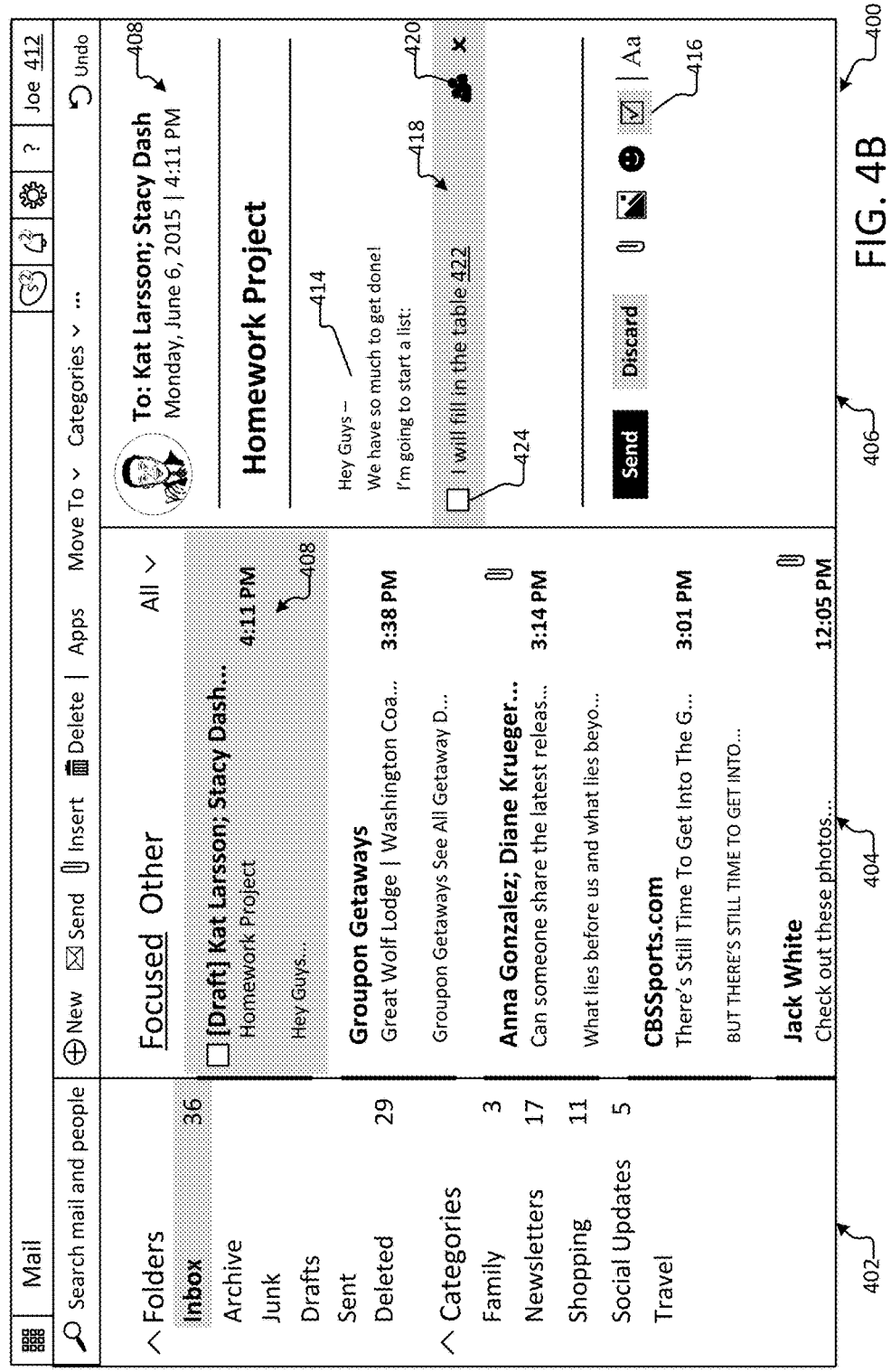
FIG. 4B illustrates an interface for creating a task list in an email application, according to a second view of an example embodiment.

FIG. 4B illustrates an interface for creating a task list in an email application, according to a second view of an example embodiment.

Similar to FIG. 4A, FIG. 4B illustrates a second view of interface 400 of an email application. The second view of interface 400 also includes navigation pane 402, list pane 404, and reading pane 406. Email 408 is a draft email that is still being drafted by "Joe" (see, e.g., user identifier 412) at 4:11 PM on Jun. 6, 2015. Email 408 includes message 414, which states: "Hey Guys—We have so much to get done! I'm going to start a list." However, in the second view, Joe has started a task list in email 408. For instance, in response to clicking a task icon 416, a formatted task list interface 418 is displayed within email 408.

The formatted task list interface 418 allows Joe to add a first task 422 specifying: "I will fill in the table." As illustrated, the formatted task list interface 418 includes an empty box 424 adjacent to the first task 422, indicating that the first task 422 has not yet been completed. Additionally, the formatted task list interface 418 provides collaborator icon 420, which may be selected to insert "at mentions" (e.g., @mentions) within a task. In aspects, the collaborator icon 420 may enable a user to insert a direct link via an @mention to another collaborator's global task list. Thus, in some cases, in addition to receiving the task list in a message (e.g., email 408), collaborators may be notified regarding the task list via an @mention.

In further aspects, the task list may be dynamic. For example, as tasks are completed within the task list, notifications may be sent to each collaborator. Additionally, rather than being buried within messages in a collaborator's inbox, the task list may be surfaced and maintained in a special pane of the email application (not shown). In some aspects, when a task list is created in formatted task list interface 418, the task list may automatically be associated with a collaborative object. Alternatively, the task list may be associated with a collaborative object by user selection (e.g., in response to selection of a "create collaborative object" icon, not shown).

As should be appreciated, the various devices, components, etc., described with respect to FIG. 4B are not intended to limit the systems and methods to the particular components described. Accordingly, additional topology configurations may be used to practice the methods and systems herein and/or some components described may be excluded without departing from the methods and systems disclosed herein.

Figure 4C:
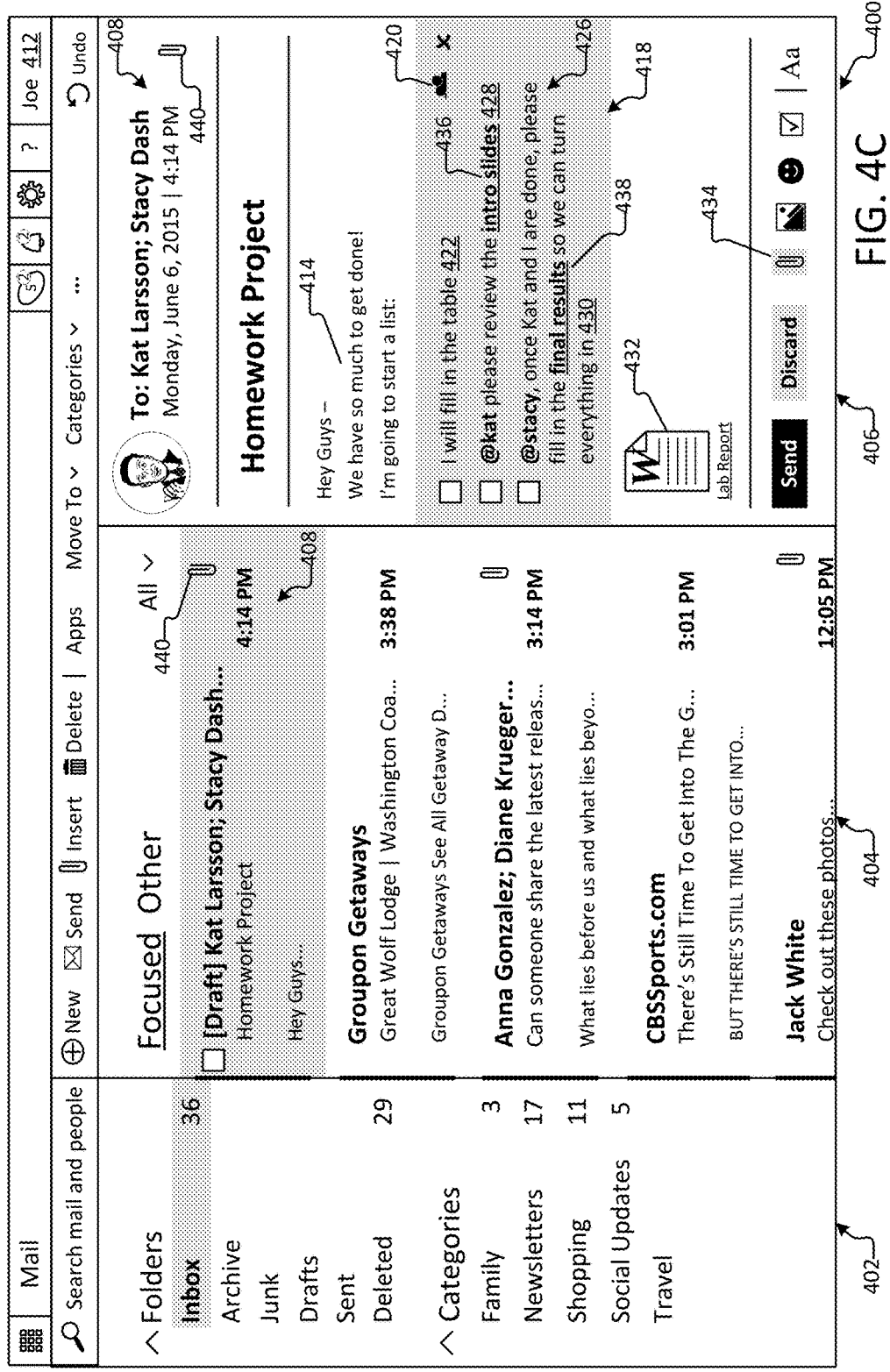
FIG. 4C illustrates an interface for creating a task list in an email application, according to a third view of an example embodiment.

FIG. 4C illustrates an interface for creating a task list in an email application, according to a third view of an example embodiment.

Similar to FIGS. 4A and 4B, FIG. 4C illustrates a third view of interface 400 of an email application. The third view of interface 400 also includes navigation pane 402, list pane 404, and reading pane 406. Email 408 is a draft email that is still being drafted by "Joe" (see, e.g., user identifier 412) at 4:14 PM on Jun. 6, 2015. Email 408 includes message 414, which states: "Hey Guys—We have so much to get done! I'm going to start a list." However, in the third view, Joe has completed a task list 426 in email 408.

As illustrated, task list 426 includes first task 422 specifying: "I will fill in the table"; second task 428 specifying: "@kat please review the intro slides"; and third task 430 specifying: "@stacy, once Kat and I are done, please fill in the final results so we can turn everything in." As described above, collaborator icon 420 enabled Joe to insert "at mentions" (e.g., @mentions) within second task 428 and third task 430. In aspects, a global task list for collaborator "Kat" may be linked to second task 428 of task list 426 via "@kat"; and a global task list for collaborator "Stacy" may be linked to third task 430 of task list 426 via "@stacy."

As further illustrated by FIG. 4C, Joe has attached document 432, entitled "Lab Report" to email 408. For instance, Joe may have selected attachment icon 434 to attach document 432 to email 408. In response to attaching document 432 to email 408, an attachment indicator 440 may be associated with email 408 in the list pane 404 and the reading pane 406. In some aspects, task list 426 may be directed to completion of a project, which may correspond to completion of document 432. Additionally, as detailed above, a collaborative object may be created that includes task list 426 and document 432. In aspects, when a document is attached to an email message including a task list, the task list and the document may automatically be associated with a collaborative object. Alternatively, the task list and the document may be associated with a collaborative object by user selection (e.g., in response to selection of a "create collaborative object" icon, not shown).

As detailed above, task list 426 may be interactive. For example, hyperlinks may be established within task list 426 for associating various tasks with content. As illustrated, a first hyperlink 436 may link second task 428 to a particular section (e.g., "intro slides" section) of document 432. A second hyperlink 438 may link third task 430 to another section (e.g., "final results" section) of document 432. In this case, in response to selection of first hyperlink 436, a user may automatically open document 432 and advance within document 432 to an intro slides section; similarly, in response to selection of second hyperlink 438, a user may automatically open document 432 and advance within document 432 to a final results section. As should be appreciated, this functionality within the task list enables Kat and Stacy to more quickly find and complete the portions of document 432 assigned to them.

As should be appreciated, the various devices, components, etc., described with respect to FIG. 4C are not intended to limit the systems and methods to the particular components described. Accordingly, additional topology configurations may be used to practice the methods and systems herein and/or some components described may be excluded without departing from the methods and systems disclosed herein.

Figure 4D:
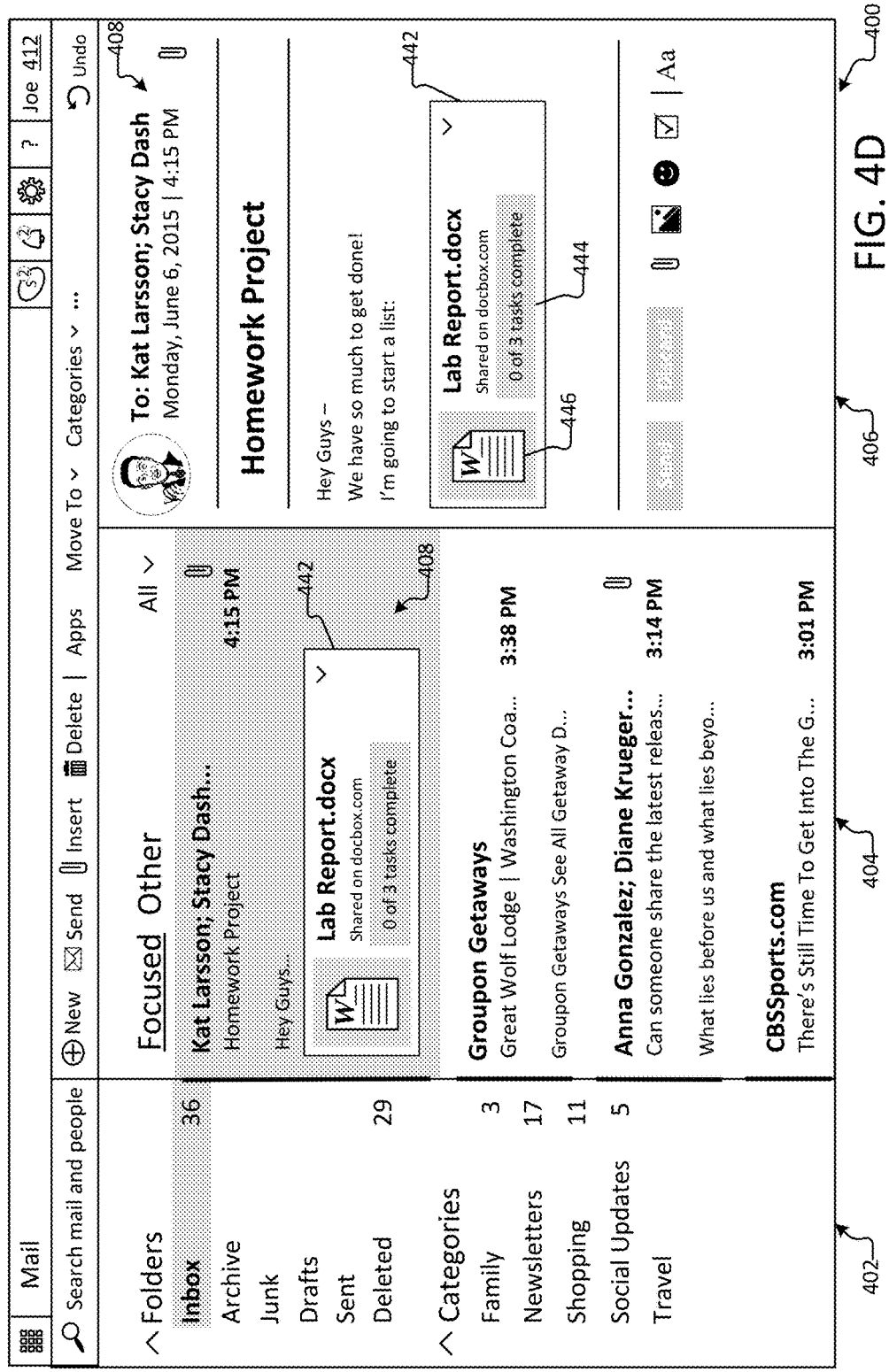
FIG. 4D illustrates an interface for creating a task list in an email application, according to a fourth view of an example embodiment.

FIG. 4D illustrates an interface for creating a task list in an email application, according to a fourth view of an example embodiment.

Similar to FIGS. 4A-4C, FIG. 4D illustrates a fourth view of interface 400 of an email application. The fourth view of interface 400 also includes navigation pane 402, list pane 404, and reading pane 406. In this case, email 408 was sent by Joe (see, e.g., user identifier 412) at 4:15 PM on Jun. 6, 2015. Accordingly, email 408 is no longer identified as a "draft" email in list pane 404. As illustrated, the task list 426 and attached document 432 are represented by a condensed view 442 of a collaborative object in email 408, as illustrated by list pane 404 and reading pane 406. In aspects, a selection to create a collaborative object including the task list 426 and attached document 432 may have been received prior to sending email 408. In other aspects, task list 426 and attached document 432 may have been automatically included in a collaborative object in response to sending email 408.

As will be further described below, condensed view 442 of the collaborative object displays a document icon 446 that represents a type of document (e.g., word processing document, spreadsheet document, presentation document, etc.) associated with the collaborative object. In this case, attached document 432 is a word processing document, as represented by document icon 446. Additionally, condensed view 442 of the collaborative object provides a status indicator 444 of the task list 426. In this case, status indicator 444 provides: "0 of 3 tasks complete." As detailed above, status indicator 444 may automatically update as tasks are completed within task list 426.

As should be appreciated, the various devices, components, etc., described with respect to FIG. 4D are not intended to limit the systems and methods to the particular components described. Accordingly, additional topology configurations may be used to practice the methods and systems herein and/or some components described may be excluded without departing from the methods and systems disclosed herein.

Figure 5:
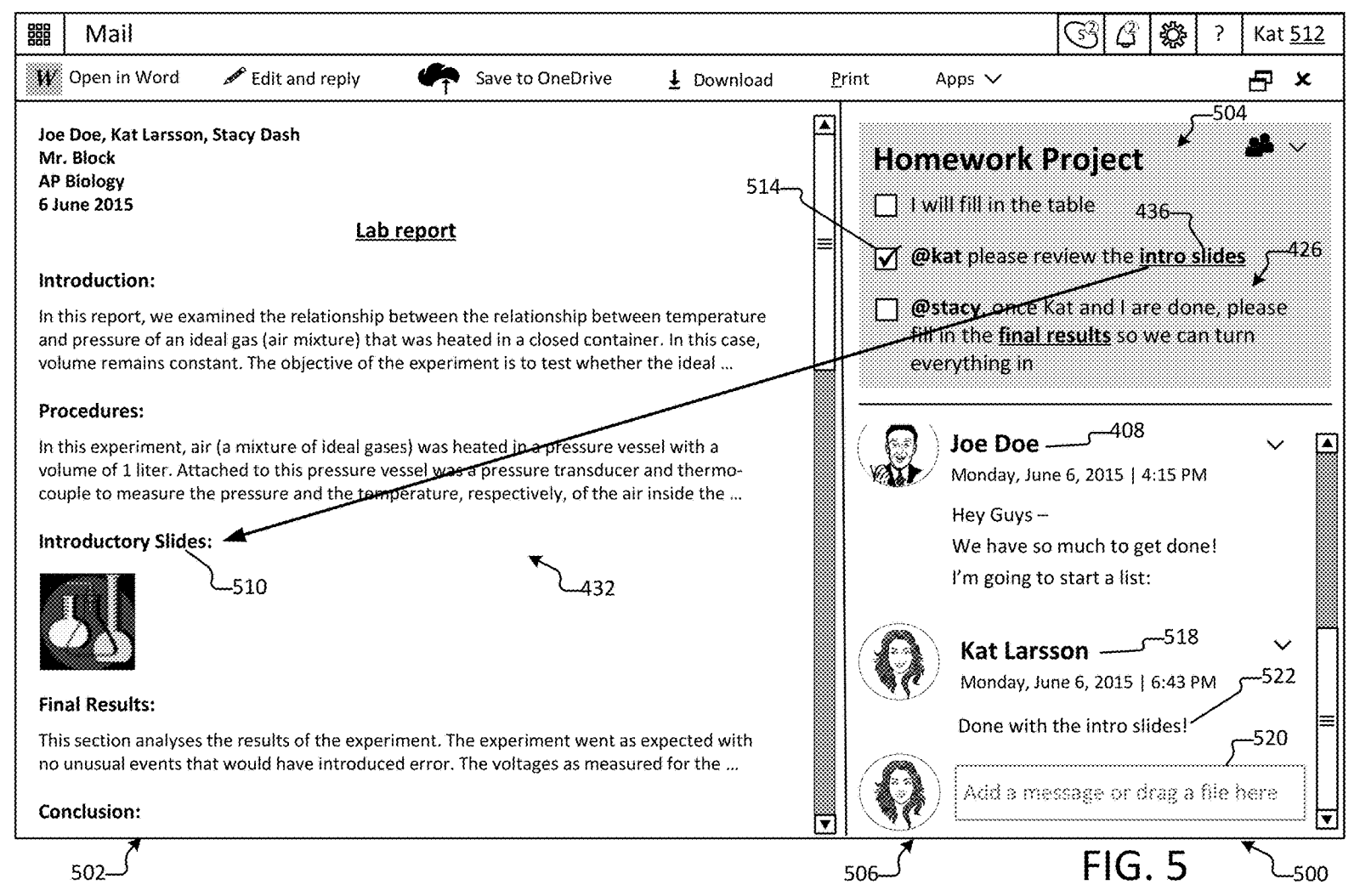

FIG. 5 illustrates an interface for opening a document associated with a collaborative object in an attachments view of an email application, according to an example embodiment.

As illustrated, interface 500 of an email application is provided. Interface 500 includes a document pane 502, a task list pane 504, and a conversation pane 506. In some aspects, a document may be opened in an attachments view of an email application by selecting the document icon within a collaborative object associated with an email. For example, with reference to FIG. 4D, Kat Larsson (see, e.g., user identifier 512) may select document icon 446 (e.g., by clicking) in email 408 and document 432 may be opened in document pane 502 of interface 500. In other aspects, a document may be launched by clicking an attachment indictor (e.g., attachment indicator 440) in an email (e.g., email 408). In this case, if the document is associated with a collaborative object, interface 500 may display the document with an associated task list and associated communications.

As further illustrated in the task list pane 504 of interface 500, Kat may select hyperlink 436 in task list 426 for completing her task (e.g., second task 428 identified in FIG. 4C). Hyperlink 436 may automatically advance a view of the document 432 to "Introductory Slides" section 510. When Kat finishes reviewing section 510 of document 432, second task 428 may automatically be updated to reflect its completion (e.g., by checked box 514). Alternatively, when Kat finishes reviewing section 510 of document 432, she may manual update second task 428 to reflect its completion (e.g., by checking box 514). In some aspects, a notification may be sent to Stacy Dash when Kat finishes reviewing section 510 and Joe finishes filling in the table (e.g., when first task 424 and second task 428 are completed) (not shown).

As shown in conversation pane 506, email 408 is displayed at the top of the conversation and a new email 518 is displayed below email 408. Email 518 was sent by Kat Larsson at 6:43 PM on Jun. 6, 2015. Message 522 of email 518 states: "Done with the intro slides!" Conversation pane 506 also provides an input field 520 for sending a new communication related to the project. In this case, the new communication may automatically be associated with the collaborative object including document 432, task list 426, and emails 408 and 518.

As should be appreciated, the various devices, components, etc., described with respect to FIG. 5 are not intended to limit the systems and methods to the particular components described. Accordingly, additional topology configurations may be used to practice the methods and systems herein and/or some components described may be excluded without departing from the methods and systems disclosed herein.

Figure 6A:
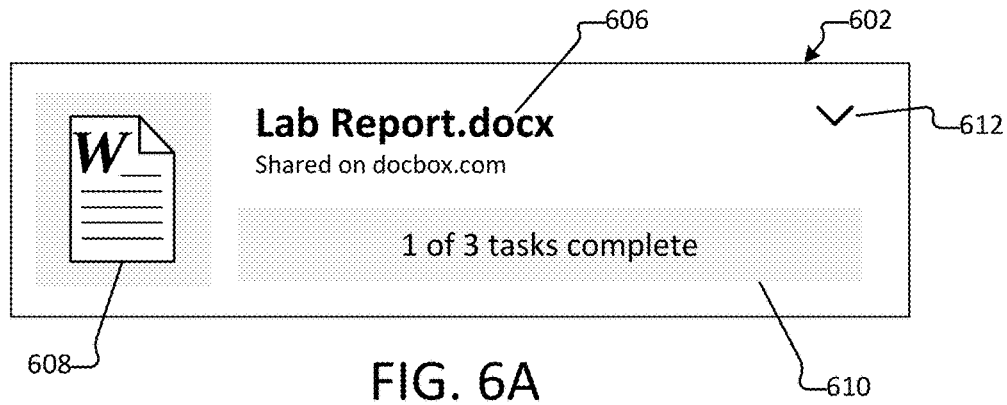
FIG. 6A illustrates a first condensed view of a collaborative object, according to an example embodiment.

FIG. 6A illustrates a first condensed view of a collaborative object, according to an example embodiment.

As described above, a UI element may be associated with a collaborative object. In aspects, the UI element may be portable such that it may be copy/pasted, drag/dropped, or otherwise moved or shared between users. In aspects, the UI element may be provided in a condensed view or an expanded view. For instance, the condensed view of the UI element may display a minimal amount of information regarding a project. For instance, as illustrated by FIG. 6A, condensed UI element 602 displays title 606 specifying a title and file extension (e.g., "Lab Report.docx") of an associated word processing document. In alternative examples, title 606 may specify a title of a project (e.g., "Homework Assignment") (not shown).

Condensed UI element 602 further displays a document indicator 608 for the associated word processing document and a status indicator 610 (e.g., "1 of 3 tasks complete") for an associated task list. In some cases, as detailed above, indicators may act as controls. For instance, in response to receiving a selection of the document indicator 608, an associated document may be opened in a document view, as illustrated by FIG. 5. An expand control 612 is further provided by condensed UI element 602. In aspects, upon selecting the expand control 612, condensed UI element 602 may expand to expanded UI element 604, as illustrated by FIG. 6B.

As should be appreciated, the various devices, components, etc., described with respect to FIG. 6A are not intended to limit the systems and methods to the particular components described. Accordingly, additional topology configurations may be used to practice the methods and systems herein and/or some components described may be excluded without departing from the methods and systems disclosed herein.

Figure 6B:
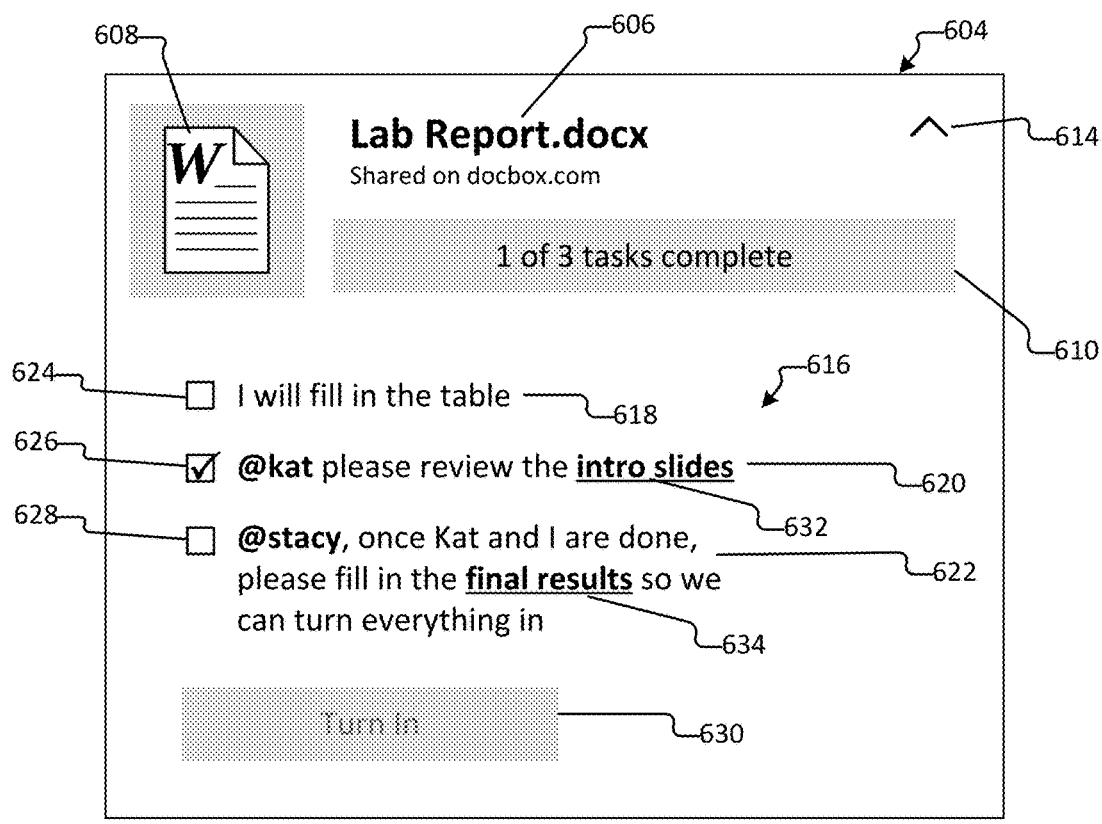
FIG. 6B illustrates a first expanded view of a collaborative object, according to a first example embodiment.

FIG. 6B illustrates a first expanded view of a collaborative object, according to a first example embodiment.

Similar to the condensed UI element 602 of FIG. 6A, expanded UI element 604 displays title 606 specifying a title and file extension (e.g., "Lab Report.docx") of an attached word processing document. Expanded UI element 604 further displays a document indicator 608 for an associated document (e.g., representative of a word processing document) and a status indicator 610 (e.g., "1 of 3 tasks complete") for an associated task list. As detailed above, in response to receiving a selection of the document indicator 608, an associated document may be opened in a document view, as illustrated by FIG. 5. A condense control 614 is further provided for returning expanded UI element 604 to condensed UI element 602, as illustrated by FIG. 6A.

Expanded UI element 604 further displays an associated task list 616 summarized by status indicator 610. As shown, task list 616 includes three tasks, a first task 618 specifying "I will fill in the table"; a second task 620 specifying "@kat please review the intro slides"; and a third task 622 specifying "@stacy, once Kat and I are done, please fill in the final results so we can turn everything in." As reflected by status indicator 610, one of the tasks (i.e., second task 620) has been completed, as indicated by checked box 626 adjacent to second task 620, and two of the tasks (i.e., first task 618 and third task 622) have not been completed, as indicated by empty boxes 624 and 628 adjacent to first task 618 and third task 622, respectively. As further illustrated by FIG. 6B, a first hyperlink 632 is associated with second task 620 and a second hyperlink 634 is associated with third task 622. As explained above, hyperlinks may associate a task with associated content. For instance, first hyperlink 632 may link to a first section (e.g., "intro slides" section) of an associated document and second hyperlink 634 may link to a second section (e.g., "final results" section) of the associated document. In aspects, upon selecting first hyperlink 632 or second hyperlink 634, the associated document may be opened and advanced to either the first section or the second section, respectively.

Additionally, expanded UI element 604 provides an action control 630 for performing an action upon completion of task list 616. In some aspects, as illustrated by FIG. 6B, action control 630 may not be selectable (e.g., grayed out) until task list 616 is complete. However, upon completion of task list 616, action control 630 may become selectable. For instance, when all tasks associated with a homework project are completed, action control 630 may become selectable for turning in the homework assignment.

As should be appreciated, the various devices, components, etc., described with respect to FIG. 6B are not intended to limit the systems and methods to the particular components described. Accordingly, additional topology configurations may be used to practice the methods and systems herein and/or some components described may be excluded without departing from the methods and systems disclosed herein.

Figure 6C:
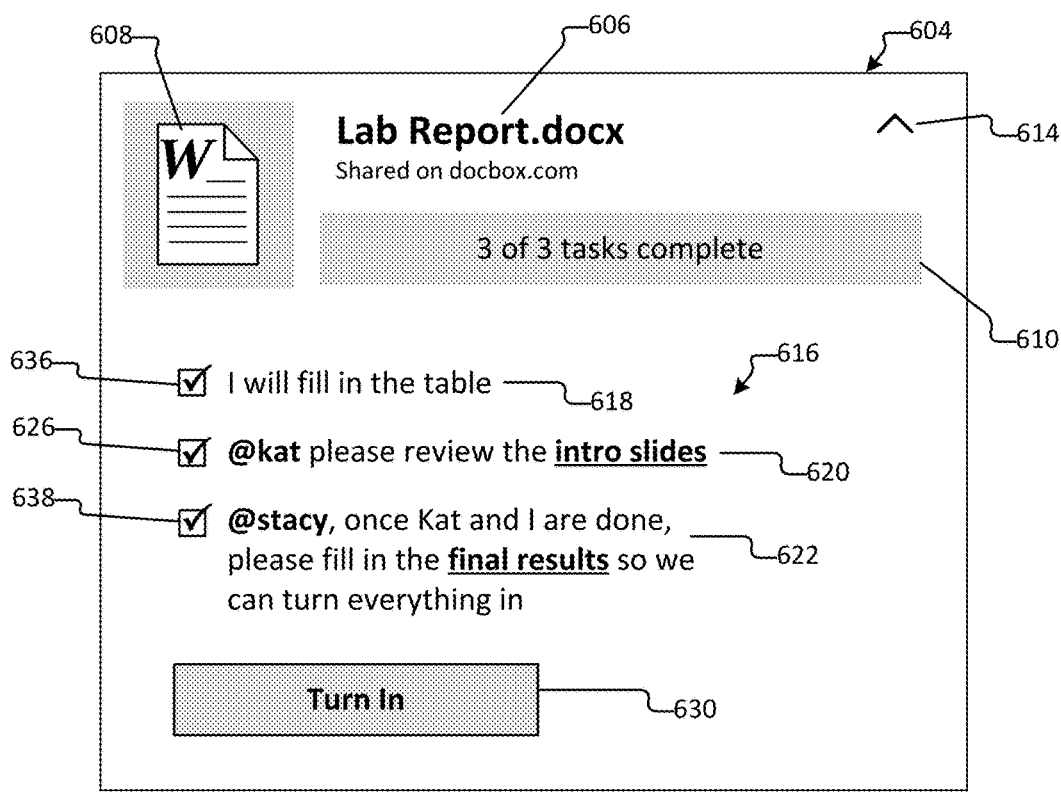
FIG. 6C illustrates a first expanded view of a collaborative object, according to a second example embodiment.

FIG. 6C illustrates a first expanded view of a collaborative object, according to a second example embodiment.

Similar to the expanded UI element 604 of FIG. 6B, expanded UI element 604 of FIG. 6C displays title 606, document indicator 608 and status indicator 610 for an associated task list. However, in this case, status indicator 610 has been updated to reflect "3 of 3 tasks complete."

Condense control 614 is provided for returning expanded UI element 604 to condensed UI element 602, as illustrated by FIG. 6A.

As illustrated by FIG. 6C, expanded UI element 604 displays the associated task list 616 summarized by status indicator 610. In this case, task list 616 includes three tasks; however, in this case, all three tasks have been completed, as indicated by checked box 636 adjacent to first task 618, checked box 626 adjacent to second task 620, and checked box 638 adjacent to third task 622. Expanded UI element 604 displays action control 630 for performing an action upon completion of task list 616. In this case, as all of the tasks of task list 616 are complete, action control 630 is now selectable. For instance, when all tasks associated with a homework assignment are completed, action control 630 may be selected and the homework assignment may be submitted to a teacher.

As should be appreciated, the various devices, components, etc., described with respect to FIG. 6C are not intended to limit the systems and methods to the particular components described. Accordingly, additional topology configurations may be used to practice the methods and systems herein and/or some components described may be excluded without departing from the methods and systems disclosed herein.

Figure 7A:
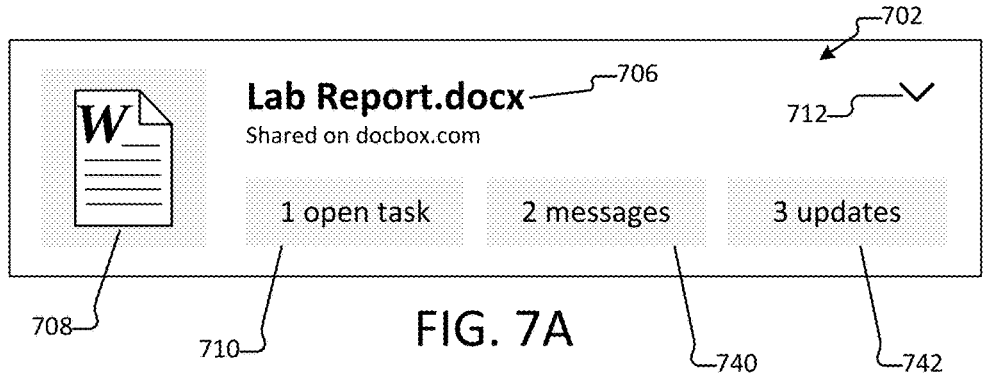
FIG. 7A illustrates a second condensed view of a collaborative object, according to an example embodiment.

FIG. 7A illustrates a second condensed view of a collaborative object, according to an example embodiment.

Similar to condensed UI element 602, condensed UI element 702 displays title 706 and a document indicator 708 for an associated word processing document. Condensed UI element 702 further provides a status indicator 710 (e.g., "1 open task") for an associated task list, as well as a communication counter 740 (e.g., "2 messages") and an update indicator 742 (e.g., "3 updates"). As detailed above, communication counter 740 may identifying a number of associated communications (or a number of recent communications, or a number of unread communications, etc.) and update indicator 742 may identify a number of updates to a document. Expand control 712 is further provided for expanding condensed UI element 702 to expanded UI element 704, as illustrated by FIG. 7B.

As should be appreciated, the various devices, components, etc., described with respect to FIG. 7A are not intended to limit the systems and methods to the particular components described. Accordingly, additional topology configurations may be used to practice the methods and systems herein and/or some components described may be excluded without departing from the methods and systems disclosed herein.

Figure 7B:
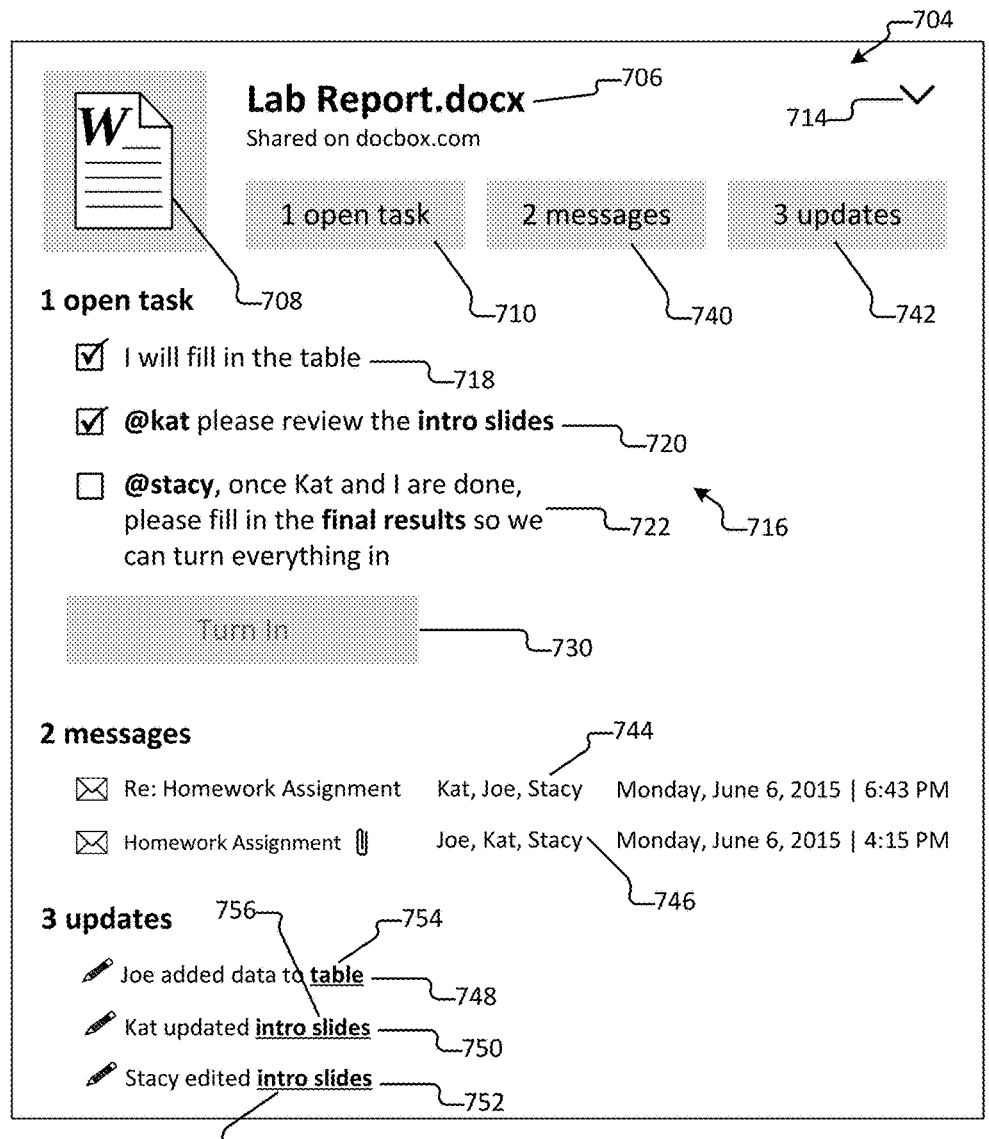
FIG. 7B illustrates a second expanded view of a collaborative object, according to an example embodiment.

FIG. 7B illustrates a second expanded view of a collaborative object, according to an example embodiment.

Similar to the condensed UI element 702, expanded UI element 704 displays title 706 and document indicator 708. Additionally, expanded UI element 704 displays status indicator 710, communication counter 740 and update indicator 742. Condense control 714 is provided for returning expanded UI element 704 to condensed UI element 702, as illustrated by FIG. 7A. Expanded UI element 704 further displays an associated task list 716 summarized by status indicator 710. As shown, task list 716 includes three tasks, a first task 718 specifying "I will fill in the table"; a second task 720 specifying "@kat please review the intro slides"; and a third task 722 specifying "@stacy, once Kat and I are done, please fill in the final results so we can turn everything in." As reflected by status indicator 710, two of the tasks (i.e., first task 718 and second task 720) have been completed (as indicated by checked boxes adjacent to first task 718 and second task 720) and one of the tasks (i.e., third task 722) has not been completed (as indicated by an empty box adjacent to third task 722). Additionally, expanded UI element 704 provides an action control 730 for performing an action upon completion of task list 716. As third task 722 has not yet been completed, action control 730 is not selectable (e.g., grayed out).

Expanded UI element 704 further displays information regarding associated communications, as summarized by communication counter 740. As detailed above, communication counter 740 specifies "2 messages," which may refer to two messages associated with a collaborative object, two recent messages, or two unread messages, etc. Message detail 744 provides additional information about a message entitled "Homework Assignment" conveyed between "Joe, Kat, Stacy," including an attachment indicator and dated Monday, Jun. 6, 2015, at 4:15 PM. Message detail 746 provides additional information about a reply message entitled "Re: Homework Assignment" conveyed between "Kat, Joe, Stacy" on Monday, Jun. 6, 2015, at 6:43 PM.

Additionally, expanded UI element 702 displays information regarding updates to a document, as summarized by update indicator 742 (e.g., "3 updates"). In this case, additional details about updates to the document include a first update 748 specifying that "Joe added data to table"; a second update 750 specifying that "Kat updated intro slides"; and a third update 752 specifying that "Stacy edited intro slides." In aspects, similar to the hyperlinks described above, the updates may also include hyperlinks such that users may quickly review the work of others. For example, first update 748 may include a first hyperlink 754 to a "table" within the document, second update 750 may include a second hyperlink 756 to "intro slides" within the document, and third update 752 may include a third hyperlink 758 to the "intro slides" within the document.

As should be appreciated, the various devices, components, etc., described with respect to FIG. 7B are not intended to limit the systems and methods to the particular components described. Accordingly, additional topology configurations may be used to practice the methods and systems herein and/or some components described may be excluded without departing from the methods and systems disclosed herein.

Figure 8A:
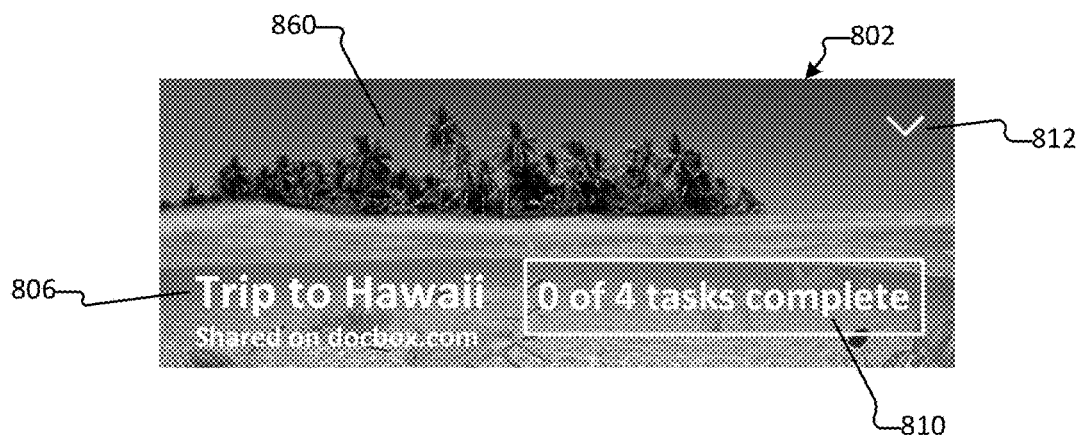
FIG. 8A illustrates a third condensed view of a collaborative object, according to an example embodiment.

FIG. 8A illustrates a third condensed view of a collaborative object, according to an example embodiment.

Figure 8B:
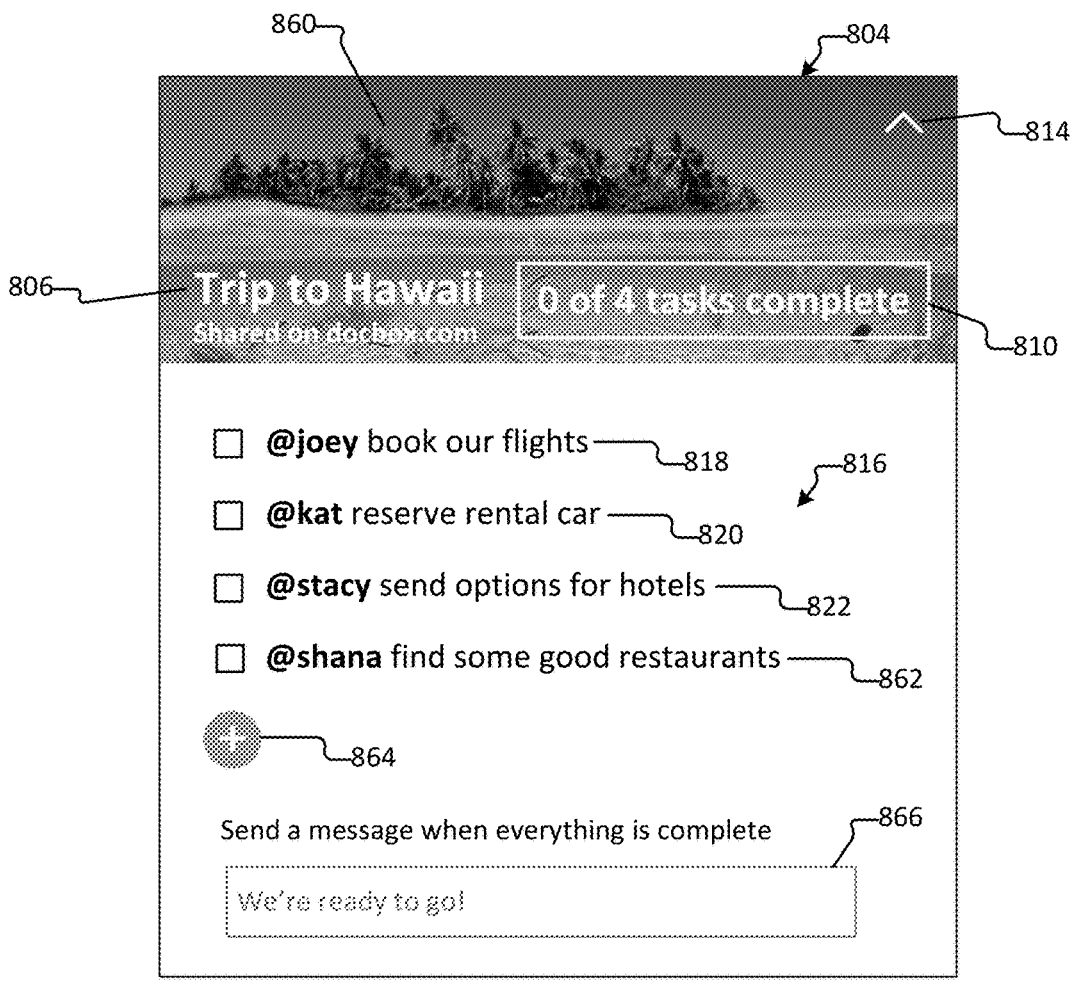
FIG. 8B illustrates a third expanded view of a collaborative object, according to a first example embodiment.

Similar to the condensed UI element 602 of FIG. 6A, condensed UI element 802 displays title 806 specifying a title of the project (e.g., "Trip to Hawaii"). Condensed UI element 802 further displays a status indicator 810 (e.g., "0 of 4 tasks complete") for an associated task list. Expand control 812 is provided for expanding condensed UI element 802 to expanded UI element 804, as illustrated by FIG. 8B. Additionally, unlike condense UI element 602, condensed UI element 802 includes an image 860 representative of the project (e.g., "Trip to Hawaii"), which is displayed as background for the condensed UI element 802. In aspects, where different images are used for different projects, image 860 enables a user to quickly and easily distinguish between various collaborative objects associated with the different projects. Additionally, in this example, a document is not associated with condensed UI element 802.

As should be appreciated, the various devices, components, etc., described with respect to FIG. 8A are not intended to limit the systems and methods to the particular components described. Accordingly, additional topology configurations may be used to practice the methods and systems herein and/or some components described may be excluded without departing from the methods and systems disclosed herein.

FIG. 8B illustrates a third expanded view of a collaborative object, according to a first example embodiment.

Similar to the condensed UI element 802, expanded UI element 804 displays title 806 and status indicator 810. Additionally, expanded UI element 804 includes image 860 as background for an upper portion of expanded UI element 804. Condense control 814 is provided for returning expanded UI element 804 to condensed UI element 802, as illustrated by FIG. 8A. Expanded UI element 804 further displays the associated task list 816 summarized by status indicator 810. As shown, task list 816 includes four tasks, a first task 818 specifying "@joey book our flights"; a second task 820 specifying "@kat reserve rental car"; a third task 822 specifying "@stacy send options for hotels"; and a fourth task 862 specifying "@shana find some good restaurants." As reflected by status indicator 810, none of the tasks associated with task list 816 have been completed, as indicated by empty boxes adjacent to each task.

Expanded UI element 804 further provides insert control 864, for associating task products with various tasks and/or for inserting additional tasks. As detailed above, a task product may include any type of output for satisfying a task or sub-task. In the present example, a first task product for first task 818 may include a reservation confirmation and details for a flight, a QR code associated with a boarding pass, etc., which task product(s) may be associated with the first task 818 upon completion. A second task product for second task 820 may include a rental car reservation confirmation, a rental car contract, etc., which may be associated with the second task 820 upon completion. A third task product for third task 822 may include search results regarding hotels in Hawaii, along with specific locations, accommodations, pricing, star ratings, contact information, etc. The third task product(s) may be associated with third task 822 during compilation or upon completion. A fourth task product for fourth task 862 may involve search results for restaurants in Hawaii, including locations, reviews, menus, contact information, etc. The fourth task product(s) may be associated with fourth task 862 during compilation or upon completion. As should be appreciated, additional or different task products may be generated for the plurality of tasks included in task list 816. In some cases, a task may be associated with multiple task products; in other cases, a task may be completed without associating a task product.

In contrast to previous examples of expanded UI elements, rather than providing an action control, expanded UI element 804 provides for sending a custom message when each task of task list 816 is completed. In aspects, the custom message may be entered into input field 866. However, as the tasks associated with task list 816 have not yet been completed, input field 866 is not selectable for input (e.g., grayed out).

As should be appreciated, the various devices, components, etc., described with respect to FIG. 8B are not intended to limit the systems and methods to the particular components described. Accordingly, additional topology configurations may be used to practice the methods and systems herein and/or some components described may be excluded without departing from the methods and systems disclosed herein.

Figure 8C:
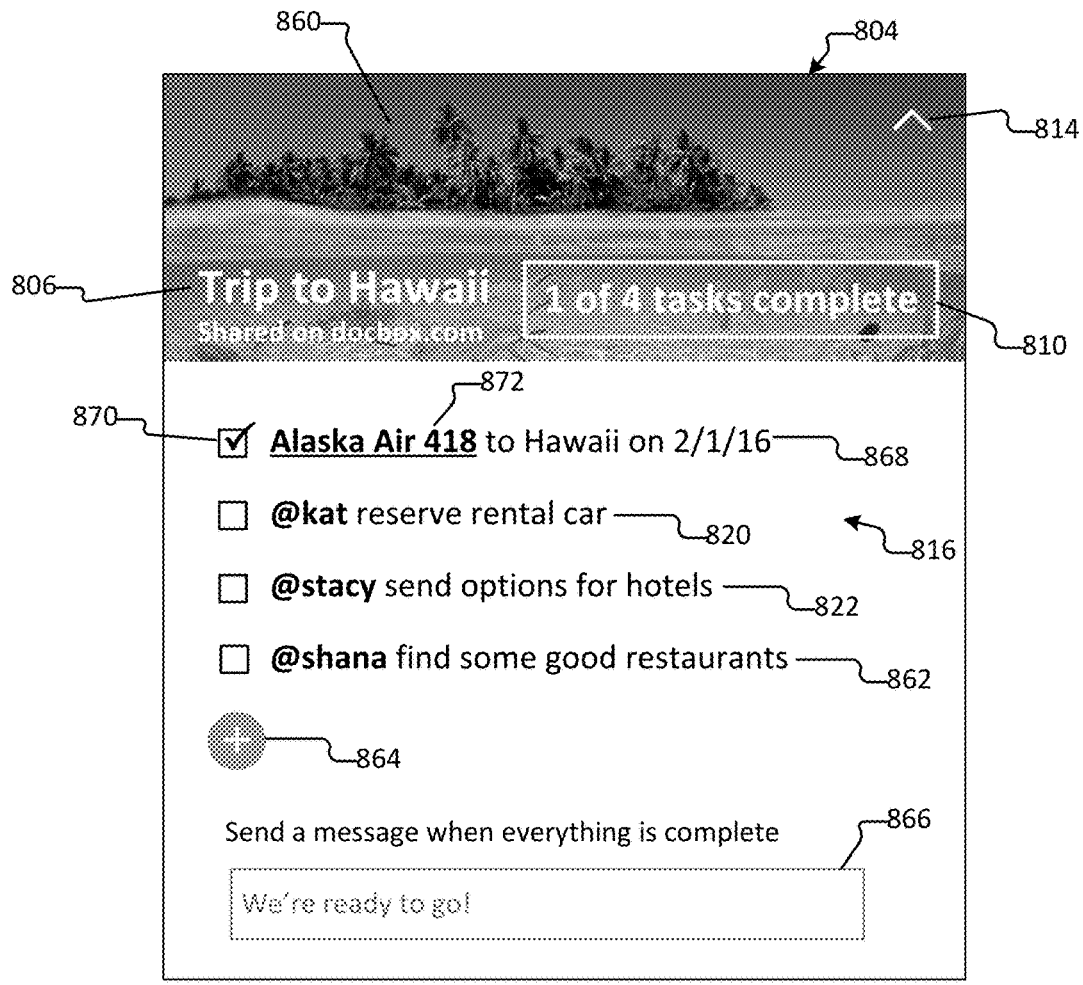
FIG. 8C illustrates a third expanded view of a collaborative object, according to a second example embodiment.

FIG. 8C illustrates a third expanded view of a collaborative object, according to a second example embodiment.

Similar to the expanded UI element 804 displayed in FIG. 8B, expanded UI element 804 displays title 806 and image 860 (displayed as background for an upper portion of expanded UI element 804). However, in this case, status indicator 810 has been updated to reflect completion of one task (e.g., "1 of 4 tasks complete"). Condense control 814 is provided for returning expanded UI element 804 to condensed UI element 802, as illustrated by FIG. 8A.

Expanded UI element 804 further displays the associated task list 816 summarized by status indicator 810. However, in this case, the first task 818 has been replaced with a first task product 868 specifying: "Alaska Air 418 to Hawaii on Feb. 1, 2016." A checked box 870 appears adjacent to first task product 868, identifying it as completed. Additionally, a hyperlink 872 has been inserted for linking to a flight reservation and/or a boarding pass for Alaska Air flight 418. As shown, task list 816 includes first task product 868, and three incomplete tasks, including second task 820, third task 822 and a fourth task 862, as indicated by empty boxes adjacent to tasks 820, 822 and 862.

As detailed above, expanded UI element 804 further provides insert control 864, for adding task products and/or additional tasks, and input field 866, for sending a custom message upon completion of task list 816. However, as all of the tasks associated with task list 816 have not yet been completed, input field 866 is not selectable for input (e.g., grayed out).

As should be appreciated, the various devices, components, etc., described with respect to FIG. 8C are not intended to limit the systems and methods to the particular components described. Accordingly, additional topology configurations may be used to practice the methods and systems herein and/or some components described may be excluded without departing from the methods and systems disclosed herein.

Figure 8D:
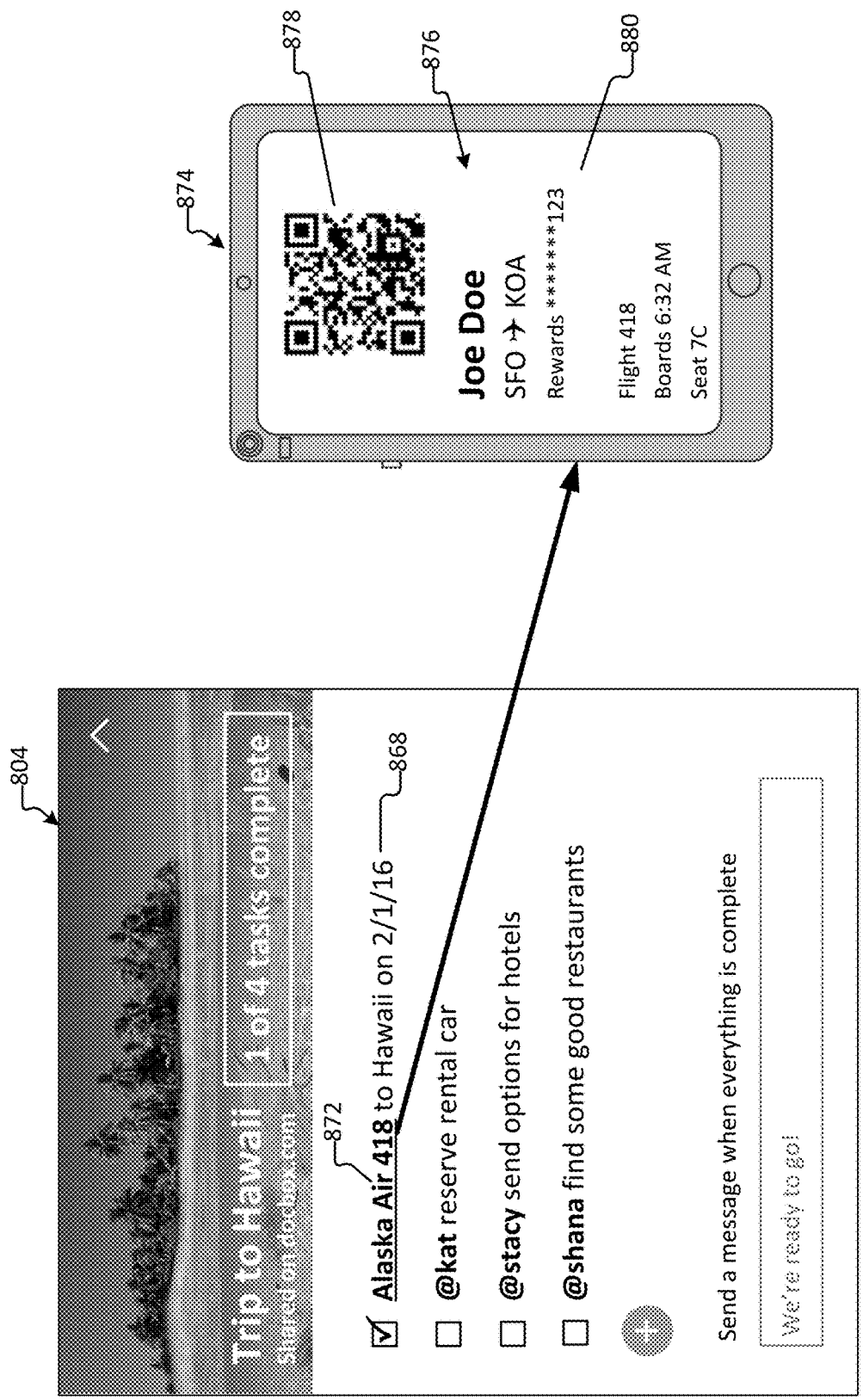
FIG. 8D illustrates a third expanded view of a collaborative object and a mobile device, according to a third example embodiment.

FIG. 8D illustrates a third expanded view of a collaborative object and a mobile device, according to a third example embodiment.

Similar to expanded UI element 804 of FIG. 8C, expanded UI element 804 of FIG. 8D illustrates first task product 868 replacing first task 818. In this case, hyperlink 872 is shown as linking to a mobile boarding pass 876 displayed in a user interface of mobile computing device 874. As shown, mobile boarding pass 876 includes QR code 878 for boarding the flight, as well as flight information 880, such as a traveler's name, a flight number, a boarding time and a seat number. As should be appreciated a task product may be associated with any information that may satisfy a task. Accordingly, the above example should not be considered limiting.

As should be appreciated, the various devices, components, etc., described with respect to FIG. 8D are not intended to limit the systems and methods to the particular components described. Accordingly, additional topology configurations may be used to practice the methods and systems herein and/or some components described may be excluded without departing from the methods and systems disclosed herein.

Figure 9:
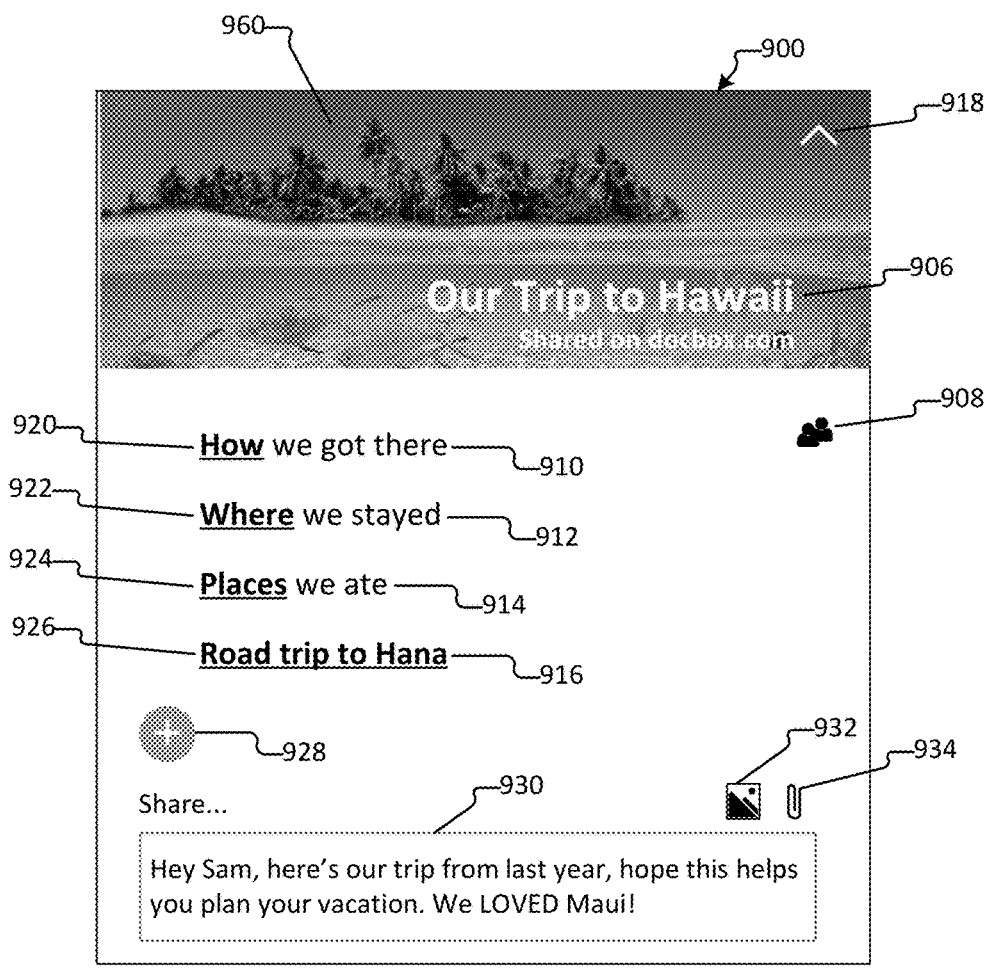
FIG. 9 illustrates a portable collaborative object, according to an example embodiment.

FIG. 9 illustrates an expanded view of a portable collaborative object, according to an example embodiment.

Portable collaborative object 900 is similar in some ways to expanded UI element 804. For instance, portable collaborative object 900 includes a title 906 (e.g., "Our Trip to Hawaii") and an image 960 displayed as background for an upper portion of portable collaborative object 900.

However, unlike expanded UI element 804, portable collaborative object 900 does not include a task list. Rather, generalized topics relating to tasks of a previous task list have replaced the tasks. For instance, topic 910 specifies "How we got there" and may relate to a previous task such as "get flight reservations," or a similar task. Topic 912 specifies "Where we stayed" and may relate to a previous task such as "get hotel reservations" or "find hotels in Hawaii," or similar task. Topic 914 specifies "Places we ate" and may relate to a previous task such as "find good restaurants," or similar task. Topic 916 specifies "Road trip to Hana" and may relate to a previous task such as "find things to do in Hawaii," or similar task. As should be appreciated, when a portable collaborative object 900 is shared with other users, it may be beneficial to summarize information associated as task products such that the portable collaborative object 900 is more useful as a resource to others.

As further displayed by portable collaborative object 900, hyperlinks may be associated with the generalized topics so as to provide useful information with the portable collaborative object 900. For instance, a hyperlink 920 may be associated with topic 910. In aspects, hyperlink 920 may provide a link to travel information to Hawaii, including airlines, flight numbers, times, etc. In further aspects, the flight information may have previously been associated with the collaborative object as a task product in satisfaction of a task. While the previous task has been replaced by generalized topic 910, a previously associated hyperlink to the flight information (i.e., a task product satisfying the previous task) may be maintained by portable collaborative object 900. According to further examples, hyperlink 922 may provide a link to hotel information for Hawaii, hyperlink 924 may provide a link to restaurant information for Hawaii, and hyperlink 926 may provide a link to photos or other information about things to do in Hawaii. As should be appreciated, portable collaborative object 900 may leverage research and specific information gathered during the planning and execution of a project that may be highly useful to other users for planning similar projects.

Portable collaborative object 900 may further include an add control 928 for inserting additional topics and/or information. An input field 930 may provide for sending a message along with portable collaborative object 900. Additionally, photographs may be attached via photo control 932 and other information including documents may be attached via attachment control 934.

In some aspects, permissions control 908 may enable permissions to be set on the portable collaborative object 900. For instance, permissions (e.g., read access, full read/write access, no access, etc.) may be set for any topic, any information associated by hyperlink, etc. For instance, with reference to a Trip to Hawaii project, a user may want to share a list of flights, but not an actual boarding pass for his or her flight to Hawaii. In this case, permissions may limit access to at least some information associated with the portable collaborative object 900. On the other hand, a user may want to allow his or her spouse full access to all information associated with the portable collaborative object 900. In this case, portable collaborative object 900 may be stored and reused for a later trip to Hawaii.

As should be appreciated, the various devices, components, etc., described with respect to FIG. 9 are not intended to limit the systems and methods to the particular components described. Accordingly, additional topology configurations may be used to practice the methods and systems herein and/or some components described may be excluded without departing from the methods and systems disclosed herein.

FIGS. 10-13 and the associated descriptions provide a discussion of a variety of operating environments in which aspects of the disclosure may be practiced. However, the devices and systems illustrated and discussed with respect to FIGS. 10-13 are for purposes of example and illustration and are not limiting of a vast number of computing device configurations that may be utilized for practicing aspects of the disclosure, as described herein.

Figure 10:
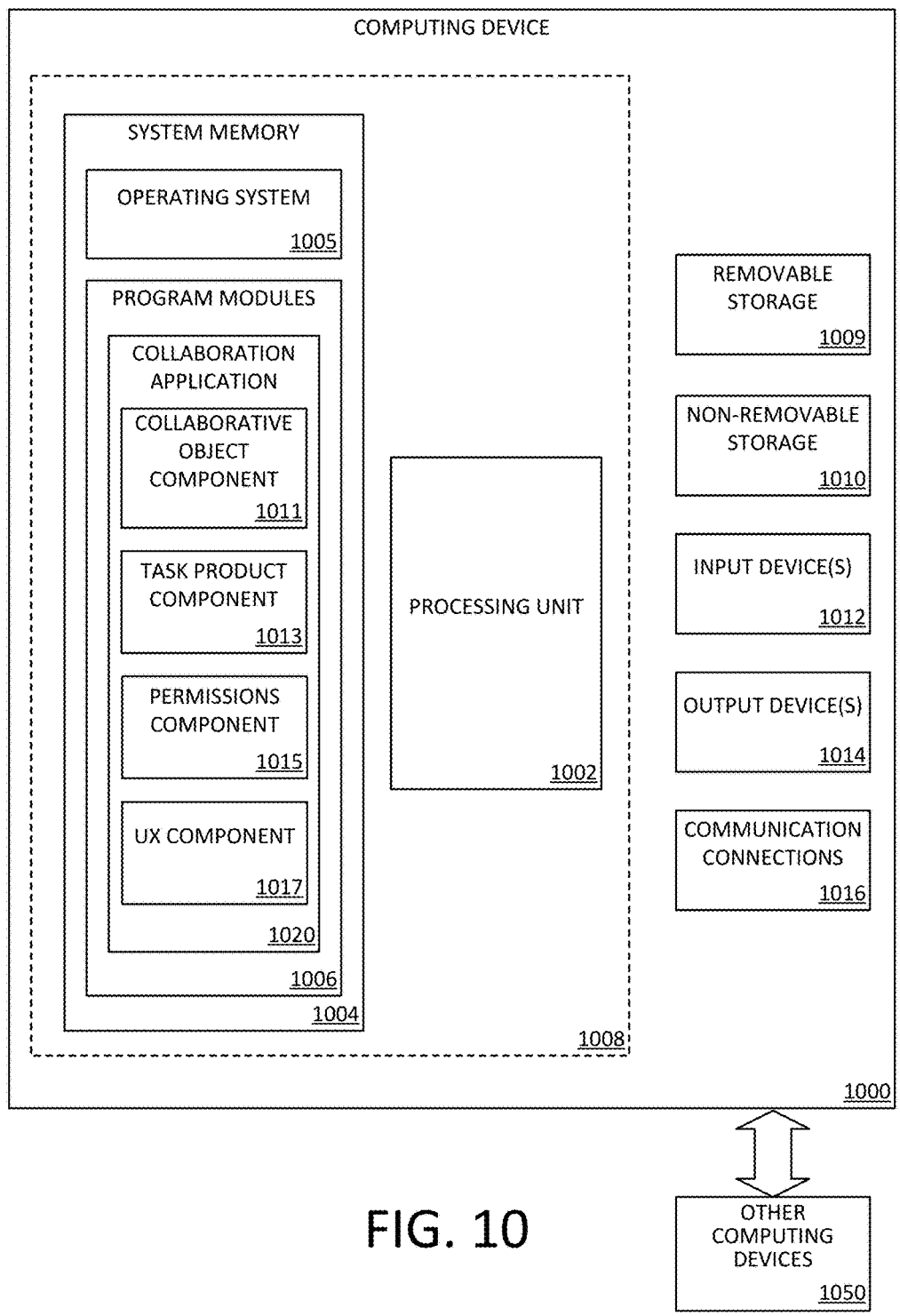
FIG. 10 is a block diagram illustrating example physical components of a computing device with which aspects of the disclosure may be practiced.

FIG. 10 is a block diagram illustrating physical components (e.g., hardware) of a computing device 1000 with which aspects of the disclosure may be practiced. The computing device components described below may have computer executable instructions for implementing a collaboration application 1020 on a computing device (e.g., server computing device 108 and/or client computing device 104), including computer executable instructions for collaboration application 1020 that can be executed to implement the methods disclosed herein. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 and one or more program modules 1006 suitable for running collaboration application 1020, such as one or more components with regard to FIG. 1 and, in particular, collaborative object component 1011 (e.g., including task component 112, communication component 114 and collaborative object component 118), task product component 1013 (e.g., corresponding to task product component 116), permissions component 1015 (e.g., corresponding to permissions component 120), and/or UX component 1017 (e.g., corresponding to UX component 122).

The operating system 1005, for example, may be suitable for controlling the operation of the computing device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., collaboration application 1020) may perform processes including, but not limited to, the aspects, as described herein. Other program modules that may be used in accordance with aspects of the present disclosure, and in particular for creating and sharing collaborative objects, may include collaborative object component 1011, task product component 1013, permissions component 1015, and/or UX component 1017, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media may be non-transitory media that does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
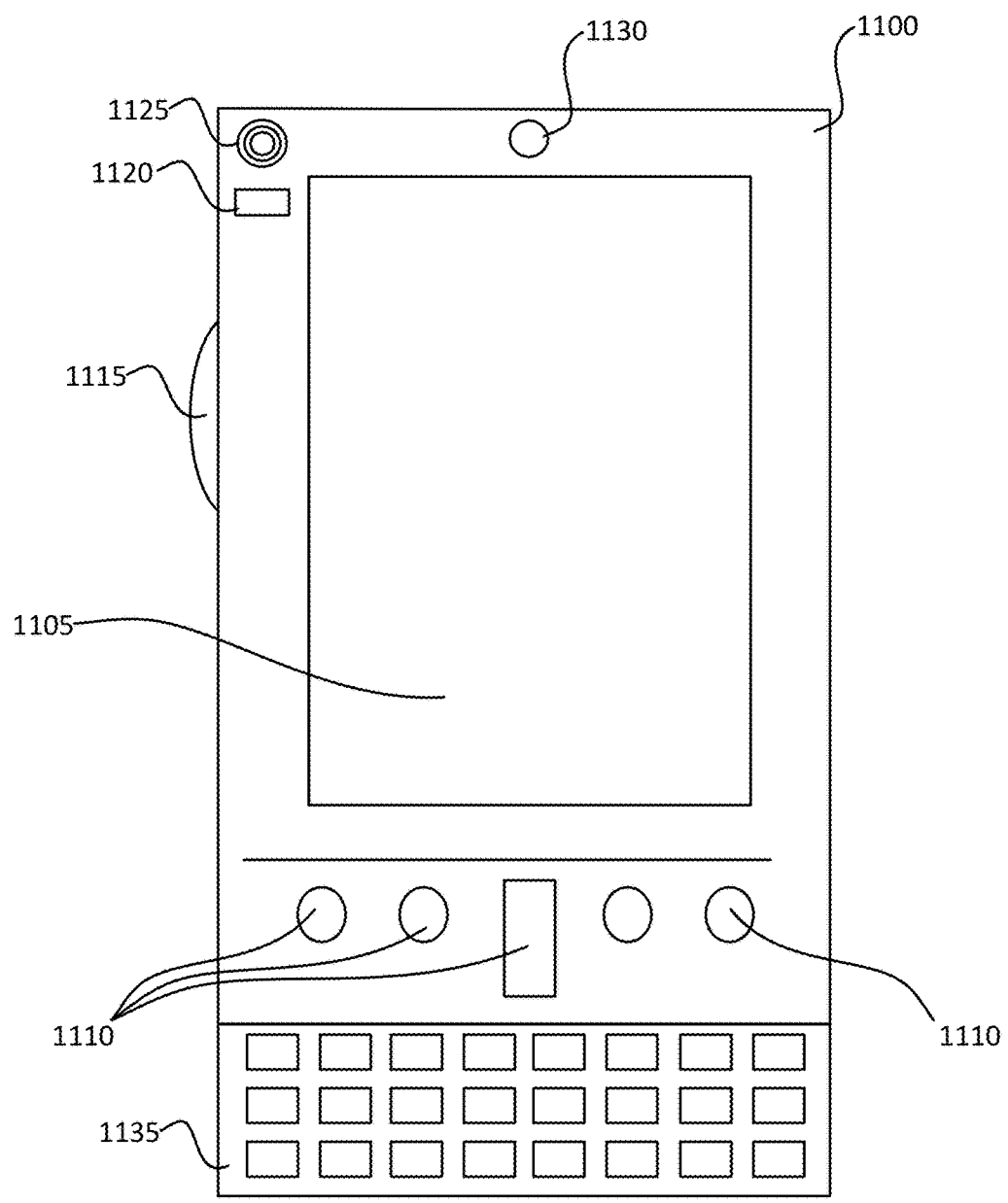
FIGS. 11A and 11B are simplified block diagrams of a mobile computing device with which aspects of the present disclosure may be practiced.
Figure 11B:
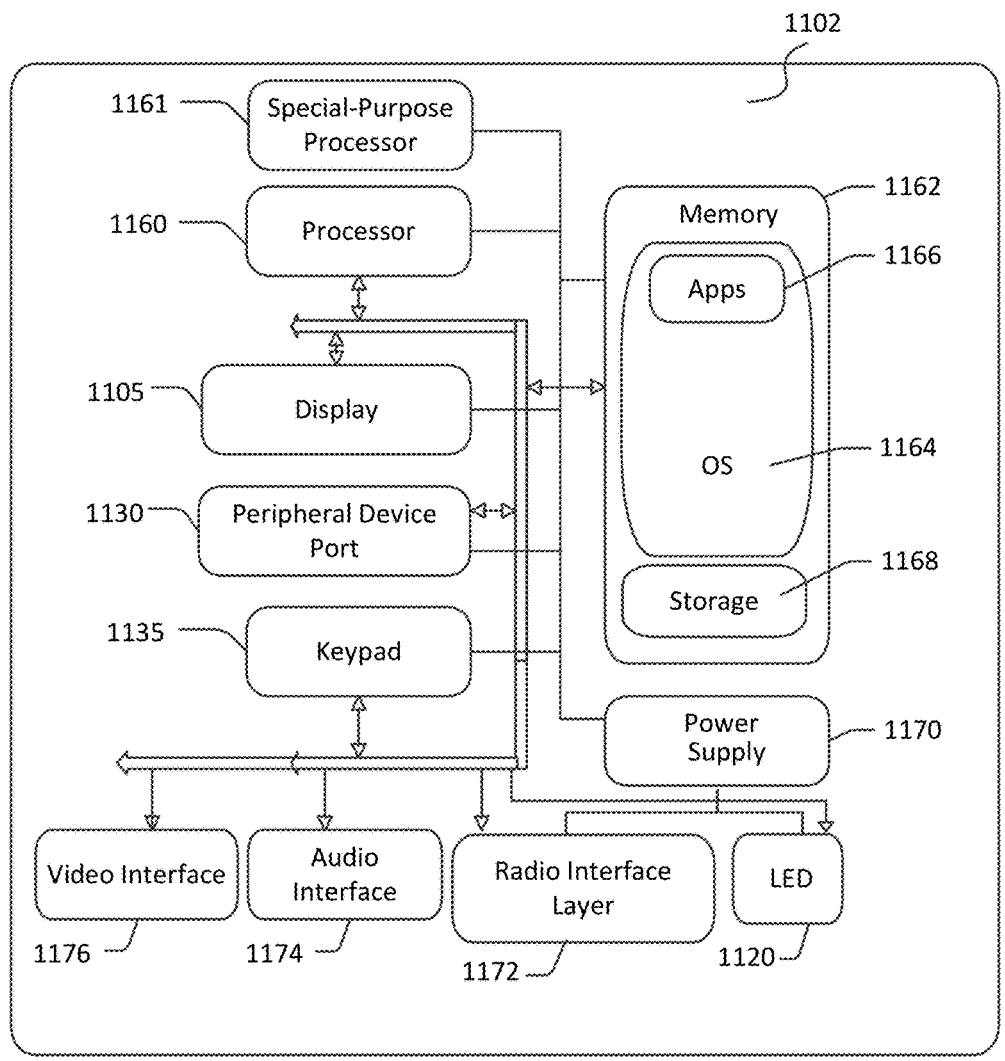

FIGS. 11A and 11B illustrate a mobile computing device 1100, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some embodiments. In yet another alternative embodiment, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various embodiments, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as email or other messages used by an email application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including the instructions for creating and sharing collaborative objects as described herein (e.g., task component, communication component, task product component, collaborative object component, permissions component, and/or UX component, etc.).

The system 1102 has a power supply 1170, which may be implemented as one or more batteries. The power supply 1170 may further include an external power source, such as an AC adapter or a powered docking cradle that supplements or recharges the batteries. The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via an audio transducer 1125 (e.g., audio transducer 1125 illustrated in FIG. 11A). In the illustrated embodiment, the visual indicator 1120 is a light emitting diode (LED) and the audio transducer 1125 may be a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of peripheral device 1130 (e.g., on-board camera) to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

As should be appreciated, FIGS. 11A and 11B are described for purposes of illustrating the present methods and systems and are not intended to limit the disclosure to a particular sequence of steps or a particular combination of hardware or software components.

Figure 12:
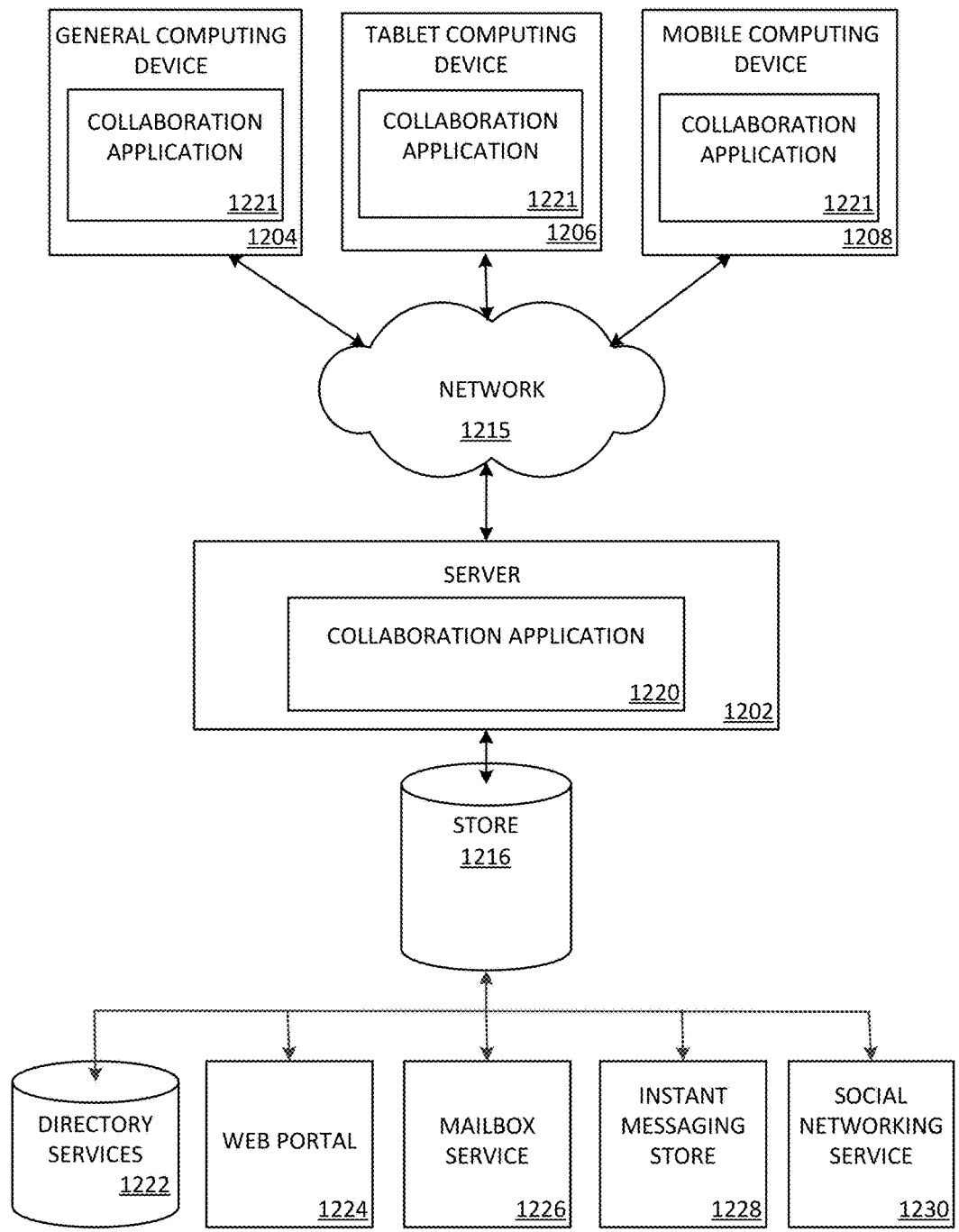
FIG. 12 is a simplified block diagram of a distributed computing system in which aspects of the present disclosure may be practiced.

FIG. 12 illustrates one aspect of the architecture of a system for processing data received at a computing system from a remote source, such as a general computing device 1204 (e.g., personal computer), tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking service 1230. The collaboration application 1221 may be employed by a client that communicates with server device 1202, and/or the collaboration application 1220 may be employed by server device 1202. The server device 1202 may provide data to and from a client computing device such as a general computing device 1204, a tablet computing device 1206 and/or a mobile computing device 1208 (e.g., a smart phone) through a network 1215. By way of example, the computer system described above with respect to FIGS. 1-11 may be embodied in a general computing device 1204 (e.g., personal computer), a tablet computing device 1206 and/or a mobile computing device 1208 (e.g., a smart phone). Any of these embodiments of the computing devices may obtain content from the store 1216, in addition to receiving graphical data useable to either be pre-processed at a graphic-originating system or post-processed at a receiving computing system.

As should be appreciated, FIG. 12 is described for purposes of illustrating the present methods and systems and is not intended to limit the disclosure to a particular sequence of steps or a particular combination of hardware or software components.

Figure 13:
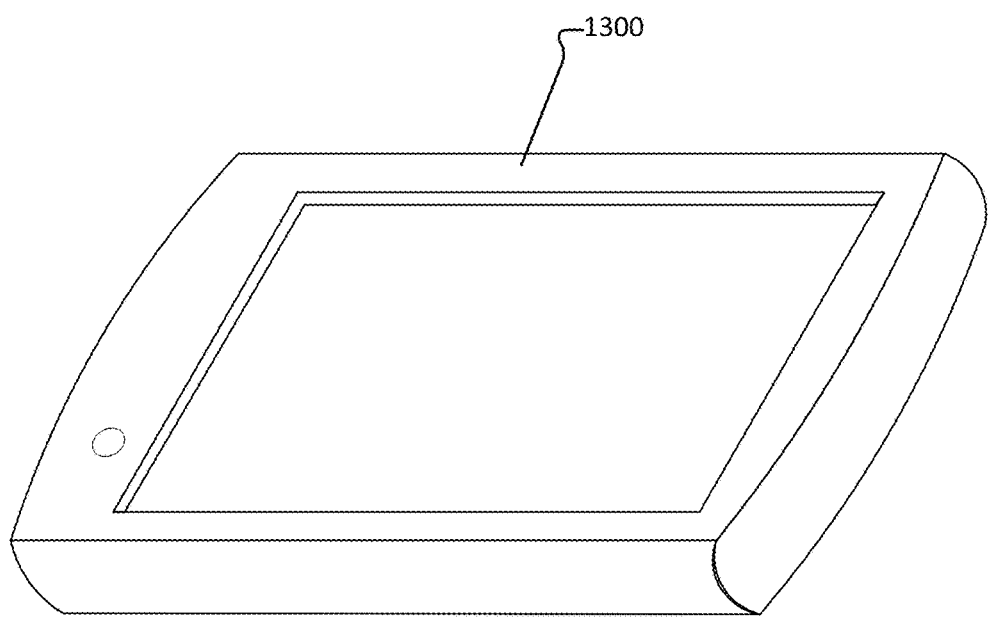
FIG. 13 illustrates a tablet computing device for executing one or more aspects of the present disclosure.

FIG. 13 illustrates an exemplary tablet computing device 1300 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 13 is described for purposes of illustrating the present methods and systems and is not intended to limit the disclosure to a particular sequence of steps or a particular combination of hardware or software components.

In a first aspect, a system is provided. The system includes a processing unit and a memory storing computer executable instructions that, when executed by the processing unit, cause the system to perform actions. For instance, in response to the computer executable instructions, the system receives a task list for a project, where the task list includes a plurality of tasks, and creates a collaborative object including the task list. Additionally, the system associates a task to a document and receives an update to the document to complete the task. In response to receiving the update to the document, the system updates the task list to reflect completion of the task and provides a control for performing an action upon completion of the task list.

With further reference to the first aspect, in response to the computer executable instructions, the system may perform one or more of the following steps, or combinations thereof. For example, the system may share the collaborative object with one or more users and/or associate one or more communications with the collaborative object. Additionally, the system may determine that the plurality of tasks are complete and receive a selection to perform the action upon completion of the task list. The system may further set one or more permissions on the collaborative object, where the one or more permissions limit access to one or more items associated with the collaborative object, including one or more of: allowing full read and write access to the collaborative object, allowing read access to the task list, allowing full read and write access to the task list, allowing read access to the document, allowing full read and write access to the document, allowing no access to the document, allowing read access to one or more communications associated with the collaborative object and allowing no access to one or more communications associated with the collaborative object. In some cases, in response to receiving the update to the document, the system may send a notification to at least one user. The task list may be received as a bulleted list or based on formatted text; in response to receiving the task list, the collaborative object may be automatically created or created upon a user selection.

In a second aspect, a method is provided. The method includes receiving a task list for a project, wherein the task list includes a plurality of tasks, and creating a collaborative object including the task list. The method further includes receiving at least one task product satisfying a task of the task list and associating the task product with the task in the collaborative object. Additionally, the method includes sharing the collaborative object with one or more users. The method may further include any combination of the above steps described with respect to the first aspect.

In yet a third aspect, a computer-readable storage medium is provided. The computer-readable storage medium stores computer executable instructions that, when executed by at least one processing unit, cause a computing device to receive a task list for a project, wherein the task list includes a plurality of tasks, and create a collaborative object including the task list. The computer executable instructions further causing the computing device to receive a communication related to the project and associate the communication with the collaborative object. Additionally, the computer executable instructions cause the computing device to receive a task product satisfying a task of the task list and associate the task product with the task in the collaborative object. Moreover, the computer-readable storage medium may include computer-executable instructions for performing any combination of the above steps described with respect to the first aspect.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processing unit; and
   at least one memory storing computer executable instructions that, when executed by the at least one processing unit, cause the system to:
     receive a task list for a project, wherein the task list includes a plurality of tasks;
     in response to receiving the task list, automatically create a collaborative object including the task list, wherein the collaborative object is represented by a portable user interface element;
     attach a document to the collaborative object, wherein a section of the document is linked to at least one task of the task list, and wherein the document is represented by an icon in the portable user interface element;
     cause the portable user interface element to be sent in a message to a recipient, wherein the portable user interface element displays a status of the task list within the message by displaying a count of open tasks, a count of messages associated with the task list, and a count of updates to the task list;
     automatically update the portable user interface element when an update to the section of the document is received from the recipient of the message to complete the at least one task, wherein the task list in the collaborative object is automatically updated to reflect completion of the at least one task, and wherein the portable user interface element within the message is automatically updated to decrease the count of open tasks and increase the count of updates; and
     in response to receiving the automatic update to the portable user interface element, provide a control within the portable user interface element for receiving an indication to perform an action upon completion of the task list.

2. The system of claim 1, the computer executable instructions further causing the system to:
share the collaborative object represented by the portable user interface element with a plurality of recipients.

3. The system of claim 1, the computer executable instructions further causing the system to:
link one or more communications with the collaborative object, wherein the one or more communications include the message.

4. The system of claim 1, the computer executable instructions further causing the system to:
determine that the plurality of tasks are complete; and
receive a selection to perform the action upon completion of the task list.

5. The system of claim 1, the computer executable instructions further causing the system to:
set one or more permissions on the collaborative object, wherein the one or more permissions limit access to one or more items linked to the collaborative object.

6. The system of claim 5, wherein the permissions comprise one or more of:
allow full read and write access to the collaborative object;
allow read access to the task list;
allow full read and write access to the task list;
allow read access to the document;
allow full read and write access to the document;
allow no access to the document;
allow read access to one or more communications associated with the collaborative object; or
allow no access to one or more communications associated with the collaborative object.

7. The system of claim 1, the computer executable instructions further causing the system to:
in response to receiving the update to the section of the document, send a notification to at least one user.

8. The system of claim 1, wherein receiving the task list comprises one of:
receive a bulleted list; or
receive formatted text.

9. The system of claim 1, wherein creating the collaborative object comprises one of:
in response to receiving the task list, automatically create the collaborative object; or
receive a selection to create the collaborative object.

10. A method performed by a computing device, the computing device comprising at least one processing unit and at least one memory storing computer executable instructions that, when executed by the at least one processing unit, cause the computing device to perform the method, the method comprising:
receiving a task list for a project, wherein the task list includes a plurality of tasks;
in response to receiving the task list, automatically creating a collaborative object including the task list, wherein the collaborative object is represented by a portable user interface element;
causing the portable user interface element to be sent in a message, wherein the portable user interface element displays a status of the task list within the message by displaying a count of open tasks, a count of messages associated with the task list, and a count of updates to the task list;
automatically updating the portable user interface element when at least one task product is received from a recipient of the message to satisfy at least one task of the task list, wherein the task list in the collaborative object is automatically updated to reflect completion of the at least one task, and wherein the portable user interface element within the message is automatically updated to decrease the count of open tasks and increase the count of updates; and
linking the at least one task product to the at least one task within the collaborative object.

11. The method of claim 10, further comprising:
receiving at least one communication related to the project; and
linking the at least one communication with the collaborative object.

12. The method of claim 10, further comprising:
setting one or more permissions on the collaborative object, wherein the one or more permissions limit access to the portable user interface element representing the collaborative object.

13. The method of claim 12, wherein the permissions comprise one or more of:
allowing full read and write access to the collaborative object;
allowing read access to the task list;
allowing full read and write access to the task list;
allowing read access to the at least one task product;
allowing full read and write access to the at least one task product;
allowing no access to the at least one task product;
allowing read access to one or more communications associated with the collaborative object; or
allowing no access to one or more communications associated with the collaborative object.

14. The method of claim 10, further comprising:
in response to receiving the at least one task product, sending a notification to at least one user.

15. The method of claim 10, wherein receiving the task list comprises one of:
receiving a bulleted list; or
receiving formatted text.

16. The method of claim 10, wherein creating the collaborative object comprises one of:
in response to receiving the task list, automatically creating the collaborative object; or
receiving a selection to create the collaborative object.

17. A computer-readable storage medium storing computer executable instructions that, when executed by at least one processing unit, cause a computing device to:
receive a task list for a project, wherein the task list includes a plurality of tasks;
in response to receiving the task list, automatically create a collaborative object including the task list, wherein the collaborative object is represented by a portable user interface element;
cause the portable user interface element to be sent in a message, wherein the portable user interface element displays a status of the task list within the message by displaying a count of open tasks, a count of messages associated with the task list, and a count of updates to the task list;
receive at least one reply to the message;
automatically update the portable user interface element by linking the at least one reply to the collaborative object and increasing the count of messages;
receive at least one task product satisfying at least one task of the task list; and
automatically update the portable user interface element by linking the at least one task product to the at least one task within the collaborative object, decreasing the count of open tasks, and increasing the count of updates.

18. The computer-readable storage medium of claim 17, the computer executable instructions further causing the computing device to:
share the portable user interface element representing the collaborative object with one or more users.

19. The computer-readable storage medium of claim 17, the computer executable instructions further causing the computing device to:
set one or more permissions on the collaborative object, wherein the one or more permissions limit access to the portable user interface element representing the collaborative object.

20. The computer-readable storage medium of claim 19, wherein the permissions comprise one or more of:
allow full read and write access to the collaborative object;
allow read access to the task list;
allow full read and write access to the task list;
allow read access to the at least one task product;
allow full read and write access to the at least one task product;
allow no access to the at least one task product;
allow read access to one or more communications associated with the collaborative object; or
allow no access to one or more communications associated with the collaborative object.

* * * * *